(12) United States Patent
Matsuyama

(10) Patent No.: US 9,779,702 B2
(45) Date of Patent: Oct. 3, 2017

(54) METHOD OF CONTROLLING HEAD-MOUNTED DISPLAY SYSTEM

(71) Applicant: COLOPL, Inc., Shibuya-ku, Tokyo (JP)

(72) Inventor: Satoshi Matsuyama, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/296,345

(22) Filed: Oct. 18, 2016

(65) Prior Publication Data

US 2017/0061936 A1    Mar. 2, 2017

Related U.S. Application Data

(63) Continuation of application No. PCT/JP2016/073782, filed on Aug. 12, 2016.

(30) Foreign Application Priority Data

Aug. 27, 2015 (JP) .................................. 2015-167470
Aug. 27, 2015 (JP) .................................. 2015-167471
Aug. 27, 2015 (JP) .................................. 2015-167472

(51) Int. Cl.
  *G09G 5/38*      (2006.01)
  *G06T 19/00*     (2011.01)
  (Continued)

(52) U.S. Cl.
  CPC .............. *G09G 5/38* (2013.01); *G06F 3/012* (2013.01); *G06F 3/013* (2013.01); *G06T 19/006* (2013.01);
  (Continued)

(58) Field of Classification Search
  CPC .......... G09G 5/38; G09G 5/377; G06F 3/012; G06F 3/013; G06T 19/006
  See application file for complete search history.

(56) References Cited

U.S. PATENT DOCUMENTS

2002/0054158 A1    5/2002  Asami
2004/0085356 A1    5/2004  Kake et al.
(Continued)

FOREIGN PATENT DOCUMENTS

JP       8329279      12/1996
JP      11153987       6/1999
(Continued)

OTHER PUBLICATIONS

International Search report dated Oct. 11, 2016.
Office Action for Japanese Patent Application No. 2015-167470 dated Jan. 5, 2016.

*Primary Examiner* — Michelle L Sams
(74) *Attorney, Agent, or Firm* — Harness, Dickey & Pierce, P.L.C.

(57) ABSTRACT

A method for providing, to a head-mounted display, a virtual space into which a user is immersed includes the step of generating a virtual space into which a user is immersed. A basic sightline of the user is determined. A main image is selected from among a plurality of display objects. The main image is caused to be displayed in the virtual space in such a manner as to be associated with the basic sightline. The virtual space is outputted to the head-mounted display. The basic sightline moves in response to a motion of the head-mounted display in a pitch direction, in a yaw direction, and in a roll direction. The main image is so placed as to be tilted such that the basic sightline forms an angle of smaller than 90° with the main image in a plane including the yaw direction and the roll direction.

20 Claims, 23 Drawing Sheets

(51) Int. Cl.
*G06F 3/01* (2006.01)
*G09G 5/377* (2006.01)
*G09G 5/00* (2006.01)

(52) U.S. Cl.
CPC ............... *G09G 5/00* (2013.01); *G09G 5/377* (2013.01); *G09G 2340/0464* (2013.01); *G09G 2354/00* (2013.01)

(56) References Cited

U.S. PATENT DOCUMENTS

| | | |
|---|---|---|
| 2006/0061567 A1 | 3/2006 | Ouchi |
| 2014/0098102 A1* | 4/2014 | Raffle ............... G06F 3/0482 345/440 |
| 2014/0354683 A1* | 12/2014 | Suzuki ............... G06T 3/4038 345/632 |
| 2015/0264338 A1 | 9/2015 | Ueno et al. |
| 2016/0018887 A1 | 1/2016 | Tsukahara et al. |
| 2016/0371886 A1* | 12/2016 | Thompson ......... G02B 27/0172 |

FOREIGN PATENT DOCUMENTS

| | | |
|---|---|---|
| JP | 200274322 | 3/2002 |
| JP | 2002352265 A | 12/2002 |
| JP | 2005038008 A | 2/2005 |
| JP | 200692156 | 4/2006 |
| JP | 2012128779 A | 7/2012 |
| JP | 2014071498 A | 4/2014 |
| JP | 2014071663 A | 4/2014 |
| JP | 2014197066 A | 10/2014 |
| WO | WO-02095684 A1 | 11/2002 |

\* cited by examiner

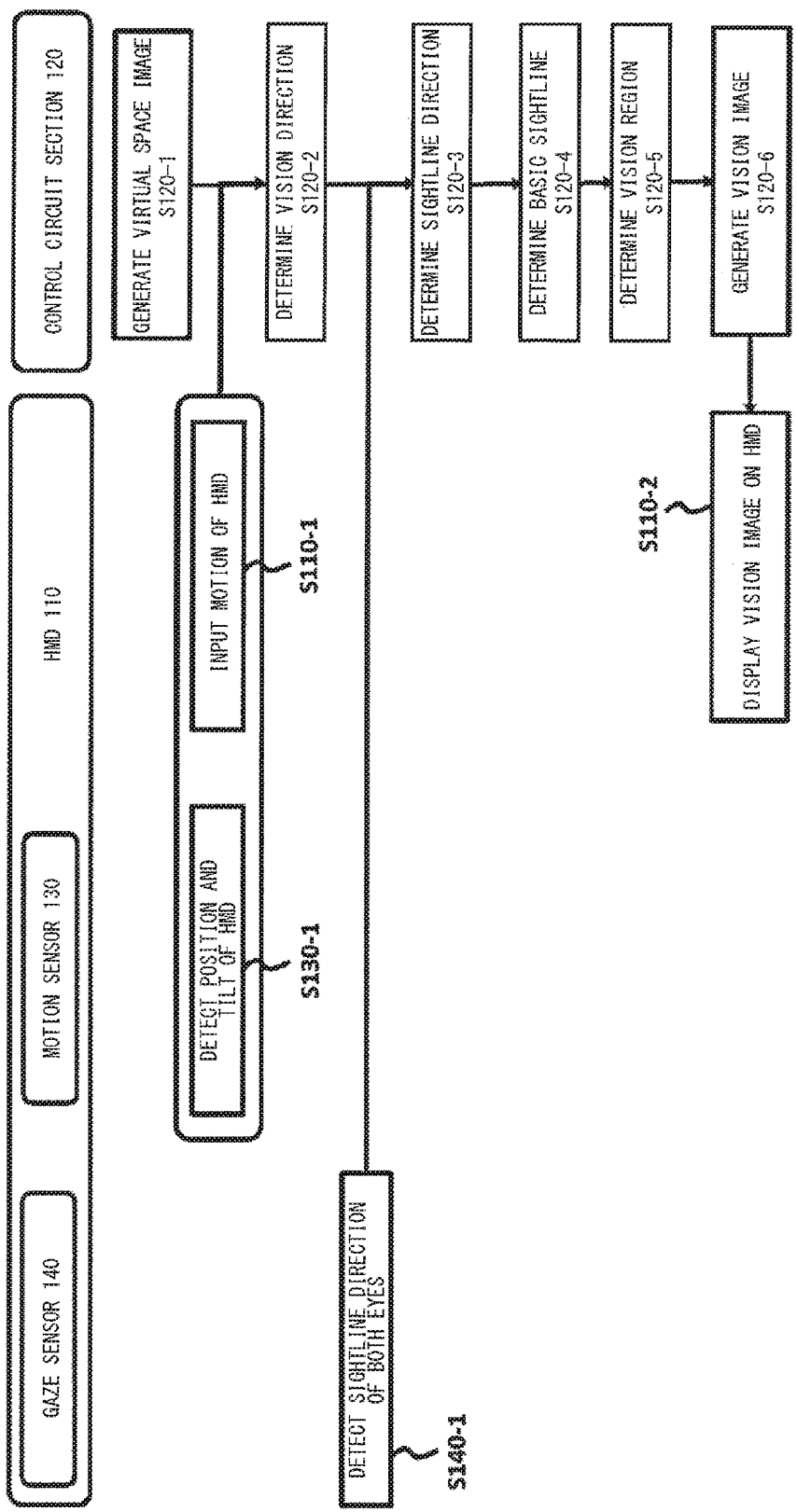

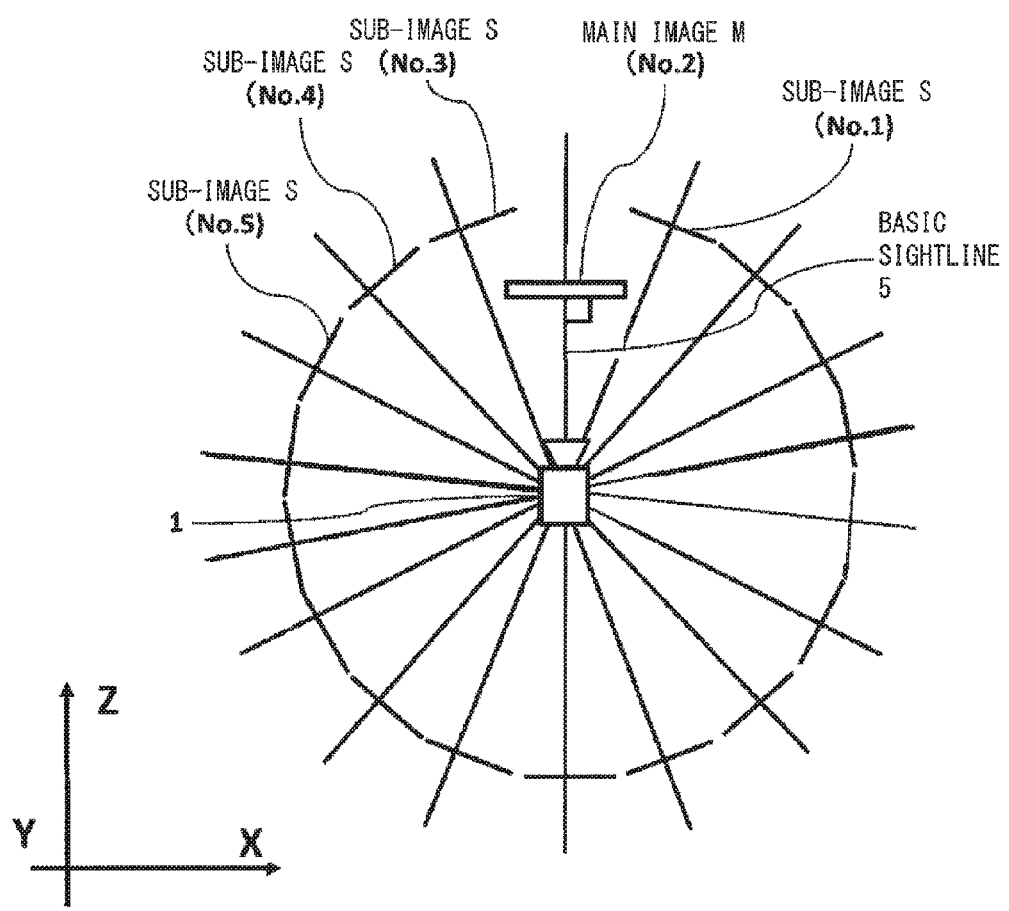

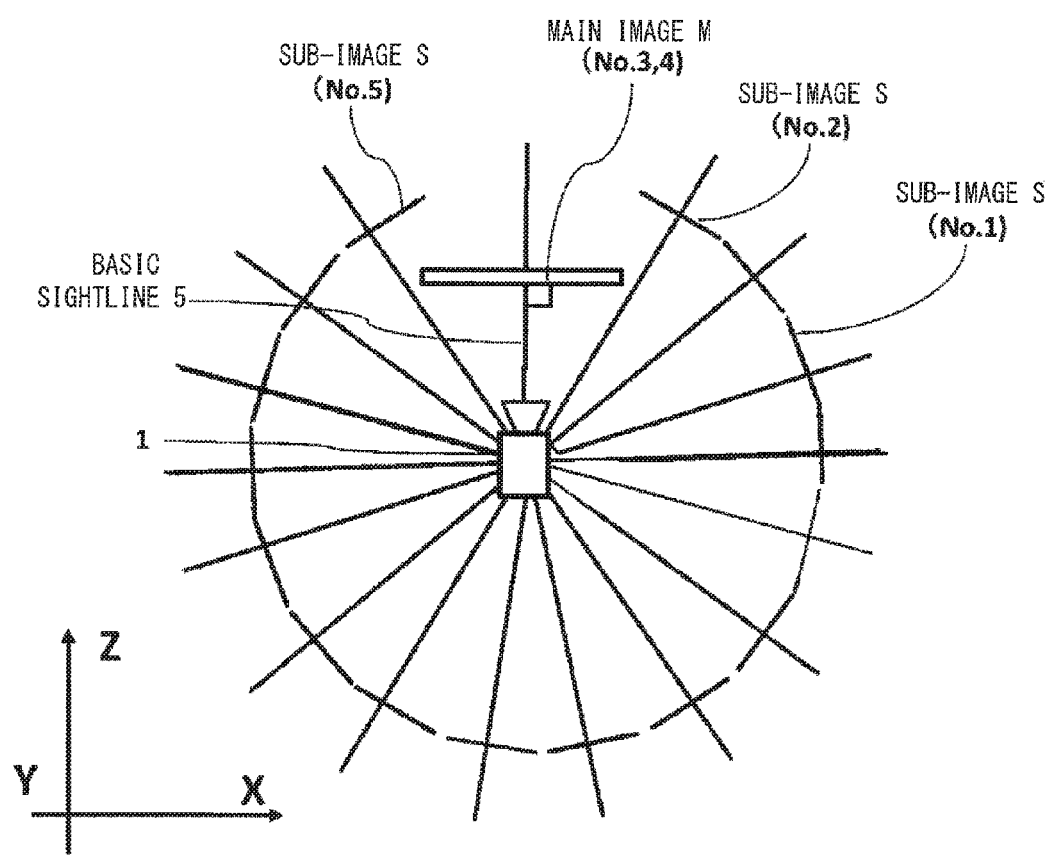

FIG. 14

| PAGE NO. | IMAGE FILE | IMAGE SIZE | DISPLAY STYLE |
|---|---|---|---|
| 1 | P001.jpg | A * A | NORMAL |
| 2 | P002.jpg | A * 2A | SPREAD |
| 3 | P003.jpg | A * 2A | SPREAD |
| 4 | P004.jpg | A * A | NORMAL |
| 5 | P005.jpg | A * A | NORMAL |
| ... | ... | ... | ... |

METHOD OF CONTROLLING HEAD-MOUNTED DISPLAY SYSTEM

CROSS-REFERENCE TO RELATED APPLICATIONS

This application is a Continuation of PCT International Application No. PCT/JP2016/073782 filed in Japan on Aug. 12, 2016, which claims the benefits of Patent Application No. 2015-167470 filed in Japan on Aug. 27, 2015, Patent Application No. 2015-167471 filed in Japan on Aug. 27, 2015, and Patent Application No. 2015-167472 filed in Japan on Aug. 27, 2015, the entire contents of which are hereby incorporated by reference.

TECHNICAL FIELD

The present disclosure relates to a program and method for causing a computer to provide a virtual space into which a user is immersed by using a head-mounted display (HMD).

RELATED ART

Patent Literature 1 discloses a display device which displays a publication as a virtual object in a virtual space to be provided to a user by using a HMD and allows the publication to be manipulated in response to a user's operation. Patent Literature 2 discloses a display control device which moves, in response to a motion of a HMD, a display position of a display object displayed in front of user's eyes by using a HMD.

CITATION LIST

Patent Literature

[Patent Literature 1]
Japanese Patent Application Publication Tokukai No. 2014-071498
[Patent Literature 2]
Japanese Patent Application Publication Tokukai No. 2014-197066

SUMMARY

The HMD system disclosed in Patent Literature 1 is a system for displaying a virtual publication, which imitates a real book, in a real space image captured by a camera which is provided in the HMD. Thus, there is a limit on the extent to which the HMD system disclosed in Patent Literature 1 can provide a unique experience of a virtual space into which the user is immersed. This also applies to the HMD system disclosed in Patent Literature 2.

The present disclosure provides a program for providing, to a head-mounted display, a virtual space into which a user is immersed, the program causing a computer to execute the steps of: generating a virtual space into which a user is immersed; determining a basic sightline of the user; selecting a main image from among a plurality of display objects having a sequence for making up a given content; causing the main image to be displayed in the virtual space in such a manner as to be associated with the basic sightline; and outputting the virtual space to the head-mounted display.

The present disclosure provides a program for providing, to a head-mounted display, a virtual space into which a user is immersed, the program causing a computer to execute the steps of: generating a virtual space into which a user is immersed; generating a plurality of display objects having a sequence for making up a given content in the virtual space, and then placing the plurality of display objects in the virtual space according to the sequence; in response to a user's operation, causing a selected one of the plurality of display objects to be displayed in a main view with an emphasis in the virtual space; and outputting the virtual space to the head-mounted display.

The present disclosure provides a program for providing, to a head-mounted display, a virtual space into which a user is immersed, the program causing a computer to execute the steps of: generating a virtual space into which a user is immersed so as to contain a virtual space image, which serves as a background, and display objects superimposed on the virtual space image; updating positions or displays of the display objects; and in updating the positions or displays of the display objects, performing processing for reducing visual effects of the display objects.

The present disclosure enables provision of a new experience in a virtual space to a user.

BRIEF DESCRIPTION OF DRAWINGS

FIG. 7 is a flow chart of a process for implementing a function of the HMD system according to at least one embodiment.

FIG. 13A is a view illustrating a relationship between a main image and sub-images according to at least one embodiment.

FIG. 13B is a view illustrating a relationship between a main image and sub-images according to at least one embodiment.

FIG. 14 is a view illustrating an example of a display object management table according to at least one embodiment.

DETAILED DESCRIPTION

Figure 1:
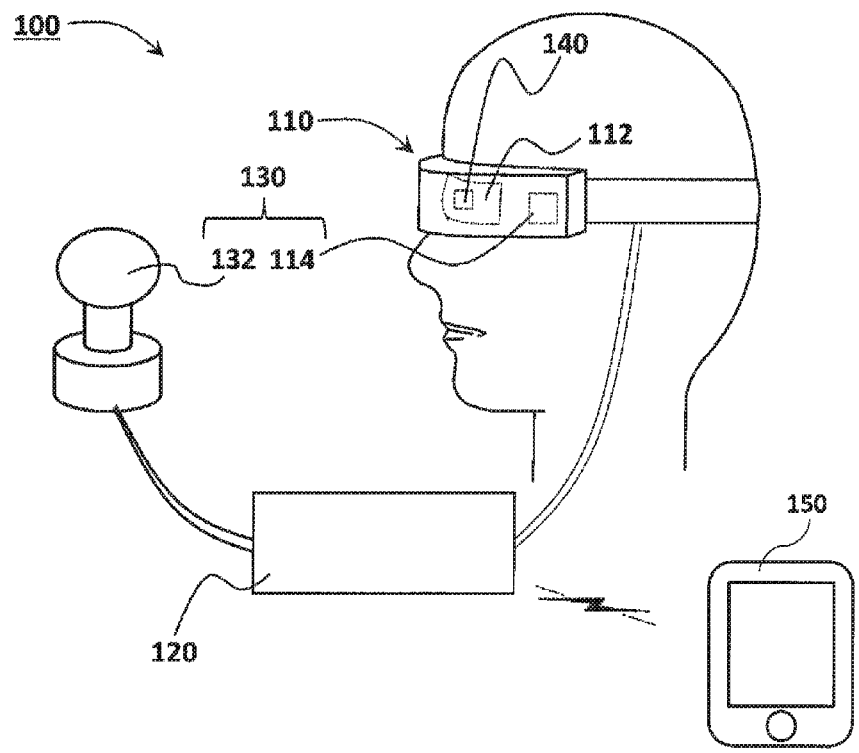
FIG. 1 is a view illustrating a HMD system according to at least one embodiment.

First, at least one embodiment will be discussed through a list form. A program for controlling an HMD in accordance with at least one embodiment includes the following configurations.

(Item 1) A program for providing, to a head-mounted display, a virtual space into which a user is immersed, the program causing a computer to execute the steps of: generating a virtual space into which a user is immersed; generating a plurality of display objects having a sequence for making up a given content in the virtual space, and then placing the plurality of display objects in the virtual space according to the sequence; in response to a user's operation, causing a selected one of the plurality of display objects to be displayed in a main view with an emphasis in the virtual space; and outputting the virtual space to the head-mounted display.

(Item 2) The program according to item 1, wherein the virtual space is generated as a panoramic image formed along a hemispherical plane thereof, the plurality of display objects are placed in a manner like a spiral along the hemispherical plane, and the display objects placed adjacent to each other in a circumferential direction of the spiral are consecutive display objects.

(Item 3) The program according to item 1 or 2, further causing the computer to execute the steps of: accepting a first action from the user; and, in response to the first action, causing the display object previously displayed in the main view to be displayed in one of sub-views without an emphasis in the virtual space, and causing the display object preceding to or subsequent to the display object previously displayed in the main view to be displayed in the main view in the virtual space.

(Item 4) The program according to item 3, further causing the computer to execute the steps of: determining a basic sightline of the user; and making a shift to a first mode in which the basic sightline is associated with a main image displayed in the main view, wherein the first action is accepted when a given user's operation is accepted in the first mode.

(Item 5) The program according to item 4, wherein in a case where a movement of the basic sightline occurs in the first mode, the main image is moved from one location to another location in pursuit of the basic sightline, and none of the display objects is placed in the location from which the main image is moved in the virtual space.

(Item 6) The program according to any one of items 1 to 5, further causing the computer to execute the steps of: accepting a second action from the user; and, in response to the second action, causing a selected one of the display objects displayed in the sub-views without the emphasis in the virtual space to be displayed in the main view in the virtual space, and causing the display object previously displayed in the main view to be displayed in one of the sub-views in the virtual space.

(Item 7) The program according to item 6, further causing the computer to execute the steps of: determining the basic sightline of the user; and making a shift to a second mode in which the basic sightline is not associated with a main image displayed in the main view, wherein the second action is accepted when a given user's operation is accepted in the second mode.

(Item 8) The program according to any one of items 1 to 7, further causing the computer to execute the steps of: determining the basic sightline of the user; making a shift to the first mode in which the basic sightline is associated with a main image displayed in the main view; and making a shift to the second mode in which the basic sightline is not associated with the main image displayed in the main view, wherein a mode is switchable between the first mode and the second mode.

(Item 9) The program according to any one of items 1 to 8, further causing the computer to execute the steps of: causing the display objects other than the display object displayed in the main view to be displayed in the sub-views without the emphasis in the virtual space; causing a selected one of the display objects displayed in the sub-views in the virtual space to be displayed in the main view in the virtual space; causing the display object previously displayed in the main view to be displayed in one of the sub-views in the virtual space, while updating displays of the display objects previously displayed in the sub-views in the virtual space; and in updating displays of the display objects previously displayed in the sub-views in the virtual space, performing processing for reducing visual effects on content items shown by the display objects.

(Item 10) A program for providing, to a head-mounted display, a virtual space into which a user is immersed, the program causing a computer to execute the steps of: generating a virtual space into which a user is immersed so as to contain a virtual space image, which serves as a background, and display objects superimposed on the virtual space image; updating positions or displays of the display objects; and, in updating the positions or displays of the display objects, performing processing for reducing visual effects of the display objects.

(Item 11) The program according to item 10, wherein the virtual space image is composed of at least one color.

(Item 12) The program according to item 11, wherein the virtual space image is composed of a single color.

(Item 13) The program according to item 11, wherein the virtual space image is composed of a plurality of colors in gradation.

(Item 14) The program according to any one of items 10 to 13, wherein during the processing for reducing visual effects of the display objects, a visual effect of the virtual space image is not reduced.

(Item 15) The program according to any one of items 10 to 14, wherein the virtual space is generated as a panoramic image formed along a hemispherical plane thereof, the plurality of display objects have a sequence for making up a given content and are placed in a manner like a spiral along the hemispherical plane, and the display objects placed adjacent to each other in a circumferential direction of the spiral are consecutive display objects.

(Item 16) A program for providing, to a head-mounted display, a virtual space into which a user is immersed, the program causing a computer to execute the steps of: generating a virtual space into which the user is immersed; determining a basic sightline of the user; selecting a main image from among a plurality of display objects; causing the main image to be displayed in the virtual space in such a manner as to be associated with the basic sightline; and outputting the virtual space to the head-mounted display.

(Item 17) The program according to item 16, wherein the main image contains two or more of the display objects making up a given content, wherein the two or more of the display objects are consecutive display objects.

(Item 18) The program according to item 16 or 17, wherein the basic sightline moves in response to a motion of the head-mounted display in a pitch direction, in a yaw direction, and in a roll direction, and the main image is so placed as to be tilted such that the basic sightline forms an angle of smaller than 90° with the main image in a plane including the yaw direction and the roll direction.

(Item 19) The program according to item 18, wherein the main image is so placed as to be tilted such that the basic sightline forms an angle of larger than 60° but smaller than 85° with the main image in the plane including the yaw direction and the roll direction.

(Item 20) The program according to any one of items 16 to 19, wherein the basic sightline moves in response to a motion of the head-mounted display in a pitch direction, in a yaw direction, and in a roll direction, and the main image is substantially orthogonal to the basic sightline in a plane including the pitch direction and the roll direction.

(Item 21) The program according to any one of items 18 to 20, wherein the main image is moved in response to the movement of the basic sightline, while maintaining an angular relationship between the basic sightline and the main image.

(Item 22) The program according to any one of items 16 to 21, wherein the basic sightline moves in response to a motion of the head-mounted display in a pitch direction, in a yaw direction, and in a roll direction, the basic sightline intersects a basic position of the main image, and the basic position is located at a position shifted in the yaw direction from a center of the main image.

(Item 23) The program according to any one of items 16 to 22, wherein a starting point of the basic sightline intersects a normal to the main image.

(Item 24) The program according to any one of items 16 to 23, further causing the computer to execute the steps of: setting a basic region based on the main image; and in a case where the basic sightline is moved to a position falling outside the basic region, moving the main image so that the basic sightline is located within the basic region.

(Item 25)

The program according to item 24, wherein the basic region is so set as to encompass the main image.

DETAILS OF EMBODIMENTS

The following will discuss at least one example of a program for controlling a head-mounted display system in accordance with at least one embodiment and at least one example of a method for providing a virtual space, the method executed by a computer under the control of the program, in accordance with at least one embodiment, with reference to the accompanying drawings. The present disclosure is not limited to the illustrative description. The present disclosure is indicated by the appended claims and all changes made within the meaning and range of equivalency of the claims are therefore intended to be embraced therein. In the following description, members that are identical to their respective corresponding members illustrated in the drawings are assigned equivalent symbols. Duplicate explanations of such members are omitted.

FIG. 1 is a view illustrating an HMD system 100 in accordance with at least one embodiment, the HMD system 100 including an HMD 110. The HMD system 100 includes the HMD 110 worn by a user around his/her head, a control circuit section 120, a motion sensor 130, a gaze sensor 140, and an external controller 150.

The HMD 110 includes: a display 112, which is a non-transmissive display device; a sensor section 114; and the gaze sensor 140. The control circuit section 120 causes an image for a right eye and an image for a left eye to be displayed on the display 112 so that a three-dimensional image having a binocular parallax is provided as a virtual space. With the display 112 placed in front of the eyes of the user, the user can be immersed in the virtual space. The virtual space contains, for example, a background, various objects that can be manipulated by the user, and various menu images.

The display 112 may include a sub-display for a right eye and a sub-display for a left eye, on which the image for a right eye and the image for a left eye are to be displayed, respectively. Alternatively, the display 112 may be realized by one display device, provided that the image for a right eye and the image for a left eye can be provided thereon. For example, shutters may be alternately opened and closed at a high speed so that an image displayed on the display 112 is perceived by either a right eye or a left eye of the user. In this manner, the image for a right eye and the image for a left eye can be provided separately.

Figure 2:
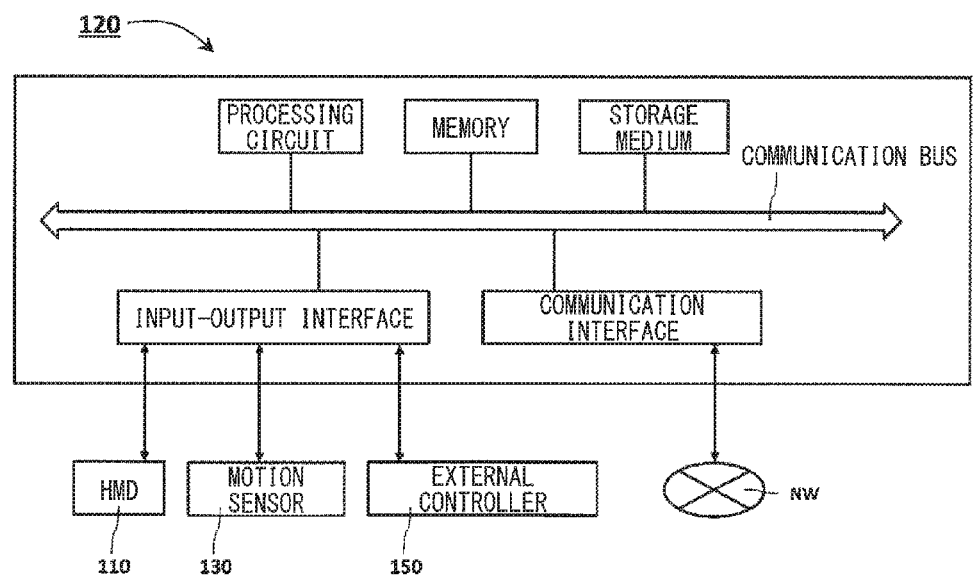
FIG. 2 is a view illustrating a hardware configuration of a control circuit section according to at least one embodiment.

The control circuit section 120 is a computer that is connected to the HMD 110. As illustrated in FIG. 2, the control circuit section 120 includes a processing circuit, a memory, a storage medium, an input-output interface, and a communication interface, all of which are connected to one another via a bus that serves as a data transmission path. The processing circuit is configured to include various types of processing circuits such as a central processing unit (CPU), a micro-processing unit (MPU), and a graphics processing unit (GPU). The processing circuit has functions of controlling both the control circuit section 120 and the whole HMD system 100. The memory is configured to include a read only memory (ROM), a random access memory (RAM), etc. and temporarily stores control data including programs to be used by the processing circuit and operation parameters. The storage medium is configured to include a non-volatile storage device such as flash memory and a hard disc drive (HDD) and stores various kinds of images, data of objects, a simulation program, and a user authentication program. The storage medium may include a database containing a table for management of various kinds of data. The input-output interface is configured to include various wired connection terminals, such as a universal serial bus (USB) terminal, a digital visual interface (DVI) terminal, and a high-definition multimedia interface (HDMI (registered trademark)) terminal, and various processing circuits for wireless connections. The input-output interface is connected to, for example, the HMD 110, various sensors including the motion sensor 130, and an external controller. The communication interface is configured to include various wired connection terminals for performing communications with an external device via a network NW and various processing circuits for wireless connections and is configured to conform to various communication standards and protocols for performing communications via a local area network (LAN) and the Internet.

The control circuit section 120 causes a given application, which is stored in the memory or in the storage medium, to be run so that a virtual space is presented on the display 112. The memory and the storage medium store programs for manipulating various objects displayed in the virtual space and displaying and controlling, for example, various menu images. The control circuit section 120 is not necessarily provided in the HMD 110. Alternatively, the control circuit section 120 may be configured as a separate hardware (e.g., a known personal computer or a server computer using a network). Further alternatively, some of the functions of the control circuit section 120 may be implemented by the HMD 110, and the remaining functions of the control circuit section 120 may be implemented by another piece of hardware.

The motion sensor 130 detects information on position and tilt of the HMD 110. The motion sensor 130 includes the sensor section 114 and a sensing section 132. The sensor section 114 may contain a plurality of light sources. The light sources are, for example, LEDs that emit infrared rays. The sensing section 132 is, for example, an infrared sensor. The sensing section 132 senses, as a sensing point of the HMD 110, infrared rays emitted from the light sources to continuously detect pieces of position and angle information of the HMD 110 in a real space in response to a motion of the user. Then, the motion sensor 130 can obtain, based on a change of the information detected by the sensing section 132 over time, a change in position and angle of the HMD 110 over time to detect information on a motion of the HMD 110.

Figure 3:
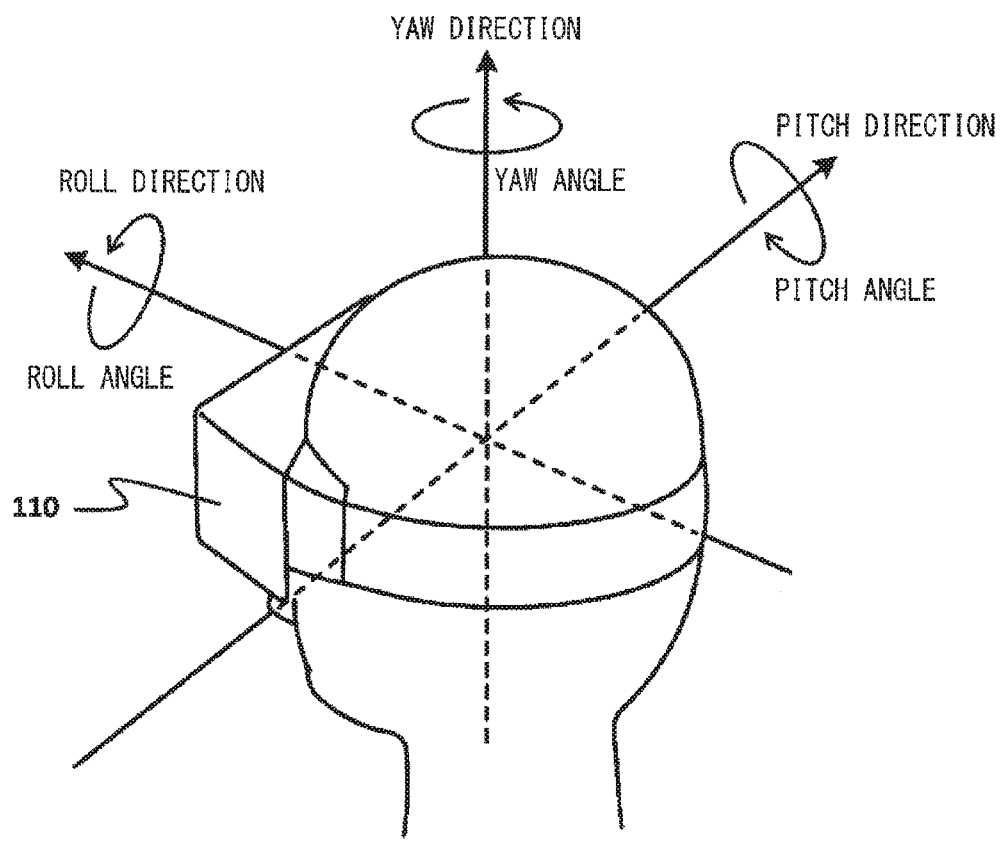
FIG. 3 is a view illustrating an orthogonal coordinate system, on a three-dimensional space, which is specified on the assumption that a head of a user who wears a HMD is a center thereof according to at least one embodiment.

With reference to FIG. 3, the following will discuss the position and tilt information obtained by the motion sensor 130. A three-dimensional coordinate system is specified on the assumption that a head of the user who wears the HMD 110 is a center thereof. A perpendicular direction in which the user stands upright is assumed to be a yaw direction. A longitudinal direction, which is orthogonal to the yaw direction, connecting the center of the display 112 and the user is assumed to be a roll direction. A lateral direction which is orthogonal to the yaw direction and the roll direction is assumed to be a pitch direction. With such an arrangement, a change in position of the user in the three-dimensional space over time is obtained. Further, a pitch angle as a tilt angle of the HMD 110 about the pitch direction, a yaw angle as a tile angle of the HMD 110 about the yaw direction, and a roll angle as a tile angle of the HMD 110 about the roll direction are obtained.

Alternatively, the motion sensor 130 may include only one of the sensor section 114, which is fixed near the display 112, and the sensing section 132. The sensor section 114 may include a geomagnetic sensor, an acceleration sensor, and a gyro sensor. By using at least one of these sensors, the sensor section 114 detects a position and tilt of the HMD 110 (the display 112, in particular) worn by the user around his/her head. This enables detection of information on a motion of the HMD 110. For example, an angular velocity sensor is capable of continuously detecting angular velocities of the HMD 110 about three axes in response to a motion of the HMD 110 to determine a change in angle about each axis over time. Such a configuration eliminates the need for the sensing section 132. The sensing section 132 may be configured to include an optical camera. Such a configuration allows the sensing section 132 to detect the information on a motion of the HMD 110 based on image information and thus eliminates the need for the sensor section 114.

The function of detecting position and tilt information of the HMD 110 by using the motion sensor 130 is referred to as "position tracking". The relationship between the position tracking performed by the motion sensor 130 and a virtual camera 1 placed in the virtual space 2 will be discussed with reference to FIG. 4. For the sake of explanation of the positions of the virtual camera 1 and the motion sensor 130 in relation to each other, the following discussion will assume that in a case where the motion sensor 130 includes the sensing section 132, the position of the motion sensor 130 corresponds to that of the sensing section 132, and in a case where the motion sensor 130 does not include the sensing section 132, the position of the motion sensor 130 corresponds to that of the sensor section 114. The virtual camera 1 is placed inside the virtual space 2, and the motion sensor 130 is placed outside the virtual space 2 (in a real space).

The virtual space 2 is formed in the shape of a hemisphere and includes a plurality of meshes that are substantially square or substantially rectangular in shape. Each of the meshes is associated with spatial information of the virtual space 2, and a vision region 23 is defined based on the spatial information. In the present embodiment, it is preferable that a center 21 of the hemisphere is so adjusted as to be constantly located, in a XZ-plane, on a line connecting the virtual camera 1 and the sensor 130. For example, the virtual camera 1 may be constantly located on the center 21. Further, in a case where the position of the virtual camera 1 is moved in an X-direction as the user wearing the HMD 110 moves, the area of the virtual space 2 may be altered so that the center 21 is positioned on the line connecting the virtual camera 1 and the motion sensor 130. In these cases, the position of the virtual camera 1 is fixed in the virtual space 2, but only the tilt of the virtual camera 1 is varied. Alternatively, the position of the virtual camera 1 may be moved in response to a movement of the motion sensor 130 in an X-direction, in a Y-direction, and in a Z-direction. Such a configuration allows for variable position settings of the virtual camera 1 in the virtual space 2.

The gaze sensor 140 has an eye tracking function of detecting a direction in which sightlines of a right eye and a left eye of the user are pointed. The gaze sensor 140 preferably includes a sensor for a right eye and a sensor for a left eye. The sensor for a right eye detects a direction in which a sightline of a right eye of the user is pointed, and the sensor for a left eye detects a direction in which a sightline of a left eye of the user is pointed. In this manner, the gaze sensor 140 detects a sightline direction in which the user gazes. The gaze sensor 140 can be a known sensor having the eye tracking function. For example, the gaze sensor 140 may apply infrared light to a right eye and a left eye and then obtain light reflected off corneas or irises of the eyes to determine rotation angles of their eyeballs.

Figure 5:
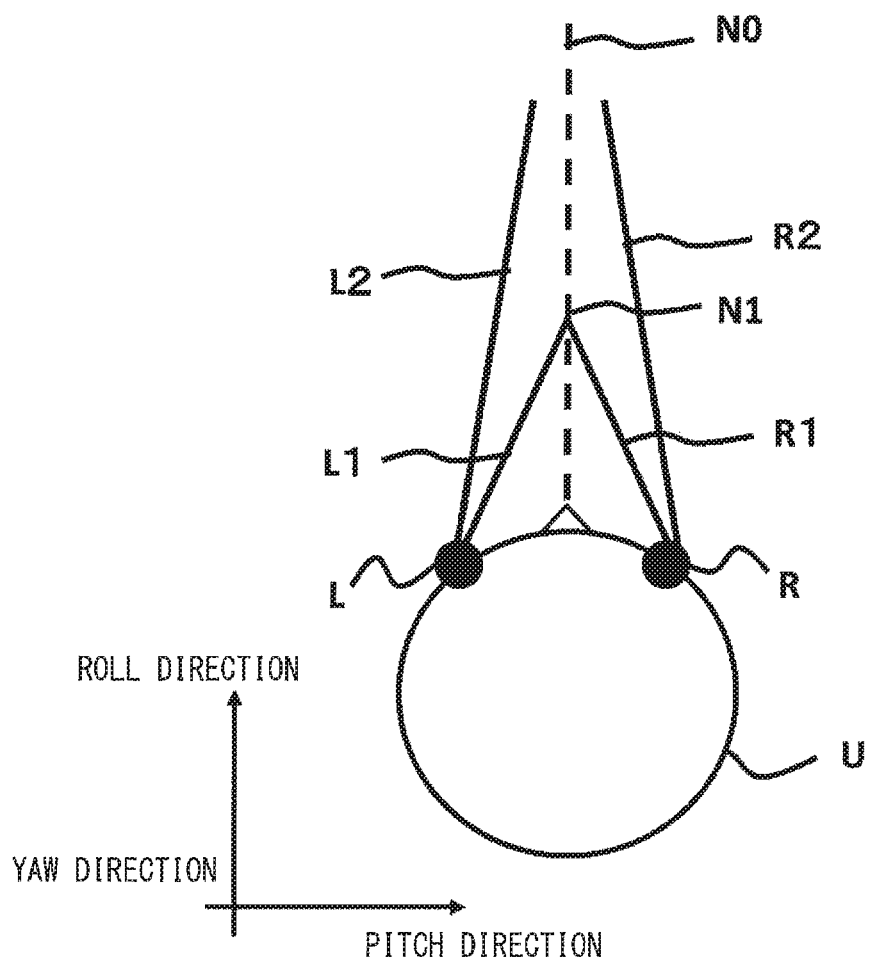
FIG. 5 is a view illustrating an example of a method for determining a sightline direction according to at least one embodiment.

As illustrated in FIG. 5, the gaze sensor 140 detects sightline directions of a right eye R and a left eye L of a user U. In a case where the user U is looking somewhere near the user U, sightlines R1 and L1 are detected. Then, a gaze point N1, which is a point of intersection of the sightlines R1 and L1, is determined. Meanwhile, in a case where the user U is looking somewhere distance from the user U, sightlines R2 and L2, which form smaller angles with the roll direction than angles formed by the sightlines R1 and L1 with the roll direction, are detected. When the gaze point N1 is determined, a sightline direction N0 of the user U is determined accordingly. The sightline direction N0 is a direction in which the user U is actually looking with his/her two eyes. The sightline direction N0 is defined as, for example, a direction in which a straight line passing through a midpoint between the right eye R and the left eye L of the user U and the gaze point N1 extends.

The external controller 150 is a device capable of performing communications through which various instructions can be sent to the control circuit section 120, and may be constituted by a portable terminal capable of performing wireless communications. The external controller 150 can be any portable device including a processing circuit, a memory, a storage medium, a communication section, a display section, and an input section, all of which are connected to one another via a bus. Examples of the external controller 150 include a smartphone, a PDA, a tablet computer, a game console, and a notebook PC. The external controller 150 is preferably a portable terminal equipped with a touch panel. The user can exert an influence on an object displayed in the virtual space by performing any of various touching actions, including a tap, a swipe, and a hold, on the touch panel of the external controller 150.

Any of the constituent members of the HMD system 100 may include a microphone-equipped headphone. Such a configuration allows the user to give voice instructions to a given object which is shown inside the virtual space. Further, any of the constituent members of the HMD system 100 may include a television receiver in order that a virtual television set provided inside the virtual space can receive a broadcast of a television program. Still further, any of the constituent members of the HMD system 100 may include a feature, such as a communication capability, in order that an e-mail and/or the like obtained by the user can be displayed.

Figure 6:
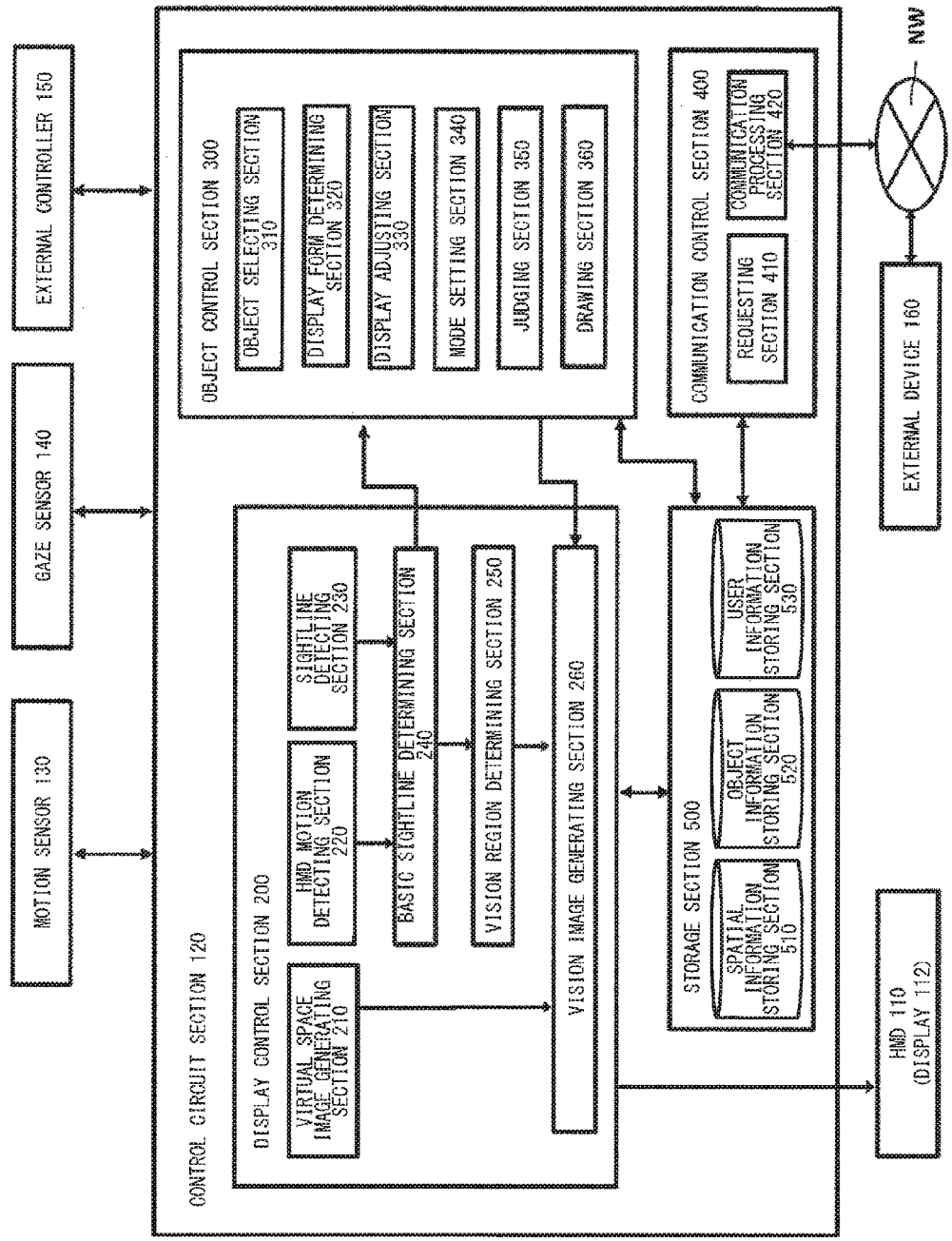
FIG. 6 is a functional block diagram of a control circuit section for realizing the functions of the HMD system according to at least one embodiment.

FIG. 6 is a functional block diagram of the control circuit section 120 for implementing the functions of the HMD system 100, i.e., the processing to display the virtual space 2, the display of various menus in the virtual space 2, and the manipulation of objects. The control circuit section 120 controls images to be outputted to the display 112, based mainly on inputs from the motion sensor 130, the gaze sensor 140, and the external controller 150.

The control circuit section 120 includes a display control section 200, an object control section 300, a communication control section 400, and a storage section 500. The display control section 200 includes a virtual space image generating section 210, a HMD motion detecting section 220, a sightline detecting section 230, a basic sightline determining section 240, a vision region determining section 250, and a vision image generating section 260. The object control section 300 includes an object selecting section 310, a display form determining section 320, a display adjusting section 330, a mode setting section 340, a judging section 350, and a drawing section 360. The communication control section 400 includes a requesting section 410 configured to request an external device 160 for various kinds data via a network NW and a communication processing section 420 configured to handle communications between the requesting section 410 and the external device. The storage section 500 includes a spatial information storing section 510, an object information storing section 520, and a user information storing section 530. The storage section 500 stores various kinds of data that are required for operations to supply output information to the display 112 in response to inputs from the motion sensor 130, the gaze sensor 140, and the external controller 150.

A flow of a process performed by the HMD system 100 to provide the virtual space 2 will be discussed with reference to FIGS. 6 and 7 according to at least one embodiment. The virtual space 2 can be provided through interactions between the HMD 110 (the gaze sensor 140 and the motion sensor 130) and the control circuit section 120.

First, the control circuit section 120 (virtual space image generating section 210) refers to the spatial information storing section 510 to generate a hemispherical virtual space image 22 that forms the virtual space 2 into which the user is immersed (S120-1). When a motion of the user, such as a movement and a tilt, is inputted to the HMD 110 (S110-1), the motion sensor 130 detects the position and tilt of the HMD 110 (S130-1). Pieces of information obtained by the detection made by the motion sensor 130 are transmitted to the control circuit section 120. Subsequently, the HMD motion detecting section 220 accepts position information and tilt information of the HMD 110. Then, a vision direction is determined based on the position information and tilt information of the HMD 110 (S120-2).

When the gaze sensor 140 detects motions of left and right eyeballs of the user (S140-1), information indicative of directions in which sightlines of left and right eyes are pointed is transmitted to the control circuit section 120. The sightline detecting section 230 determines the directions in which sightlines of the left and right eyes are pointed and then determines the sightline direction N0 (S120-3). The basic sightline determining section 240 determines the vision direction determined based on the tilt of the HMD 110 or the sightline direction N0 of the user to be a basic sightline 5 (S120-4).

Figure 4:
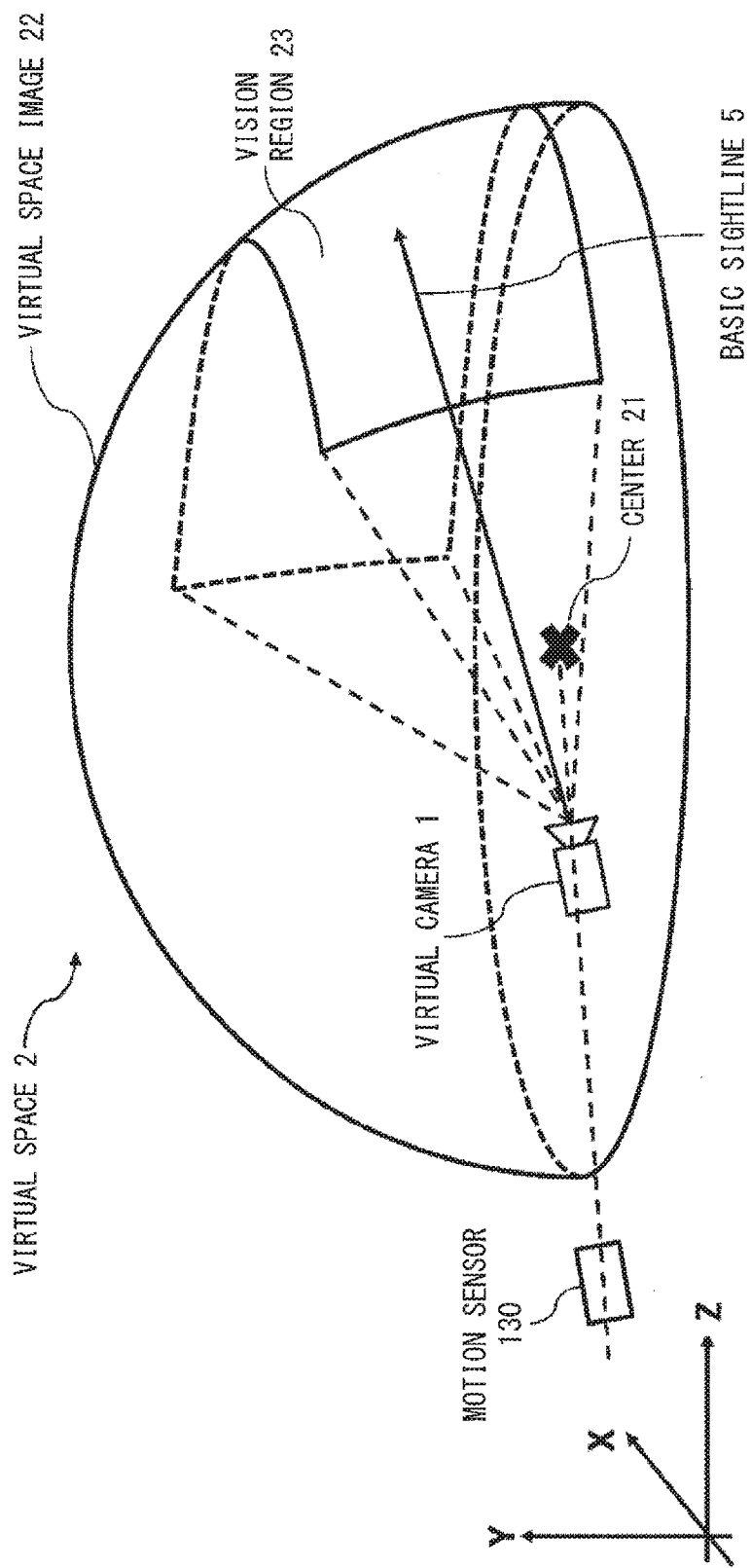
FIG. 4 is a view of a XYZ-space illustrating an example of a virtual space according to at least one embodiment.
Figure 8A:
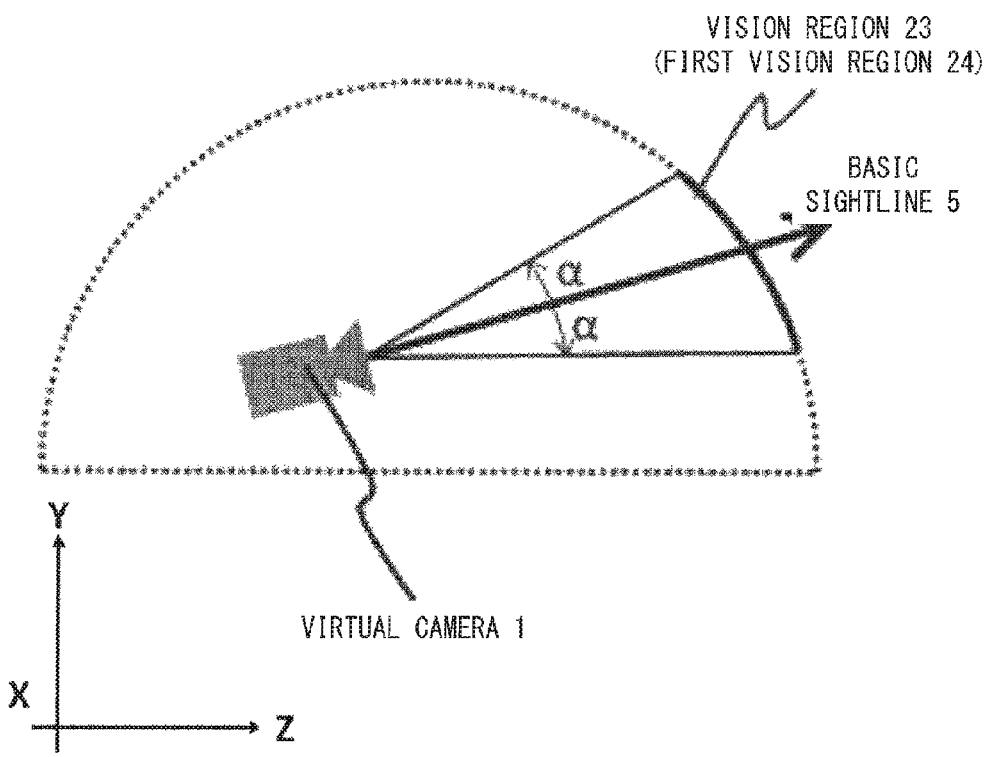
FIG. 8A is a YZ-plane view of a vision region when viewed from an X-direction according to at least one embodiment.
Figure 8B:
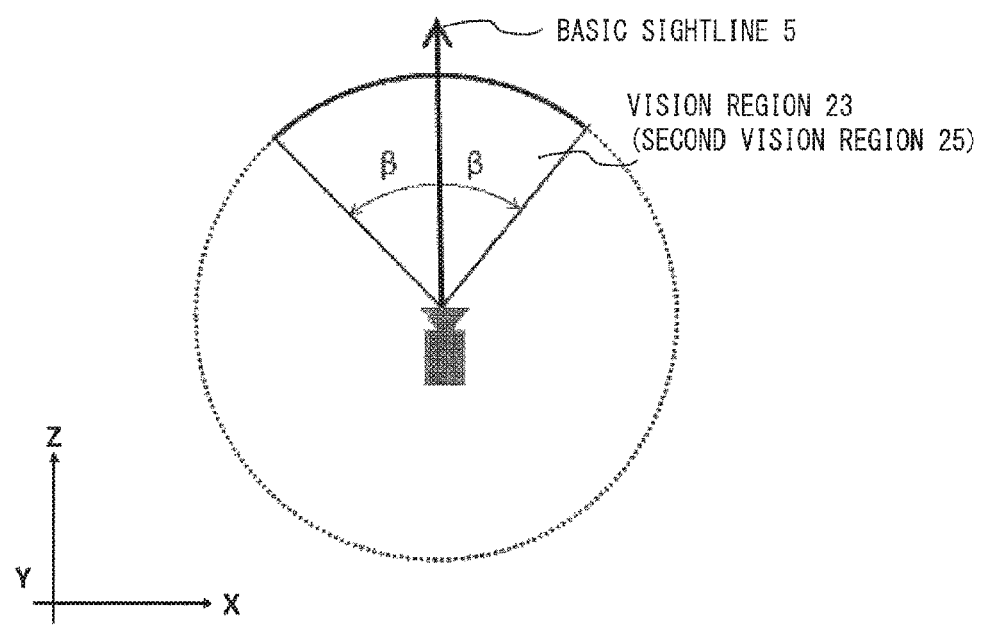
FIG. 8B is an XZ-plane view of the vision region when viewed from a Y-direction according to at least one embodiment.

The vision region determining section 250 determines the vision region 23 of the virtual camera 1 in the virtual space 2 (S120-5). As illustrated in FIG. 4, the vision region 23 is an area corresponding to a user's vision in the virtual space image 22. The vision region 23 is determined based on the basic sightline 5, which is determined based on the position and tilt of the virtual camera 1. FIG. 8A is a YZ-plane view of the vision region 23 when viewed from an X-direction, and FIG. 8B is an XZ-plane view of the vision region 23 when viewed from a Y-direction.

The vision region 23 has a first vision region 24 (see FIG. 8A), which is a range defined by the basic sightline 5 and a YZ-section of the virtual space image 22, and a second vision region 25 (see FIG. 8B), which is a range defined by the basic sightline 5 and a XZ-section of the virtual space image 22. The first vision region 24 is set as a range including a polar angle α formed about the basic sightline 5. The second vision region 25 is set as a range including an azimuth angle β formed about the basic sightline 5.

The vision image generating section 260 generates a vision image 26 based on the vision region 23 (S120-6). The vision image 26 includes two two-dimensional images, i.e., a two-dimensional image for a left eye and a two-dimensional image for a right eye. These two-dimensional images are superimposed on the display 112, so that a three-dimensional image as the virtual space 2 is provided to the user. The HMD 110 receives information on the vision image 26 from the control circuit section 120 and then causes the vision image 26 to be displayed on the display 112 (S110-2).

Figure 9:
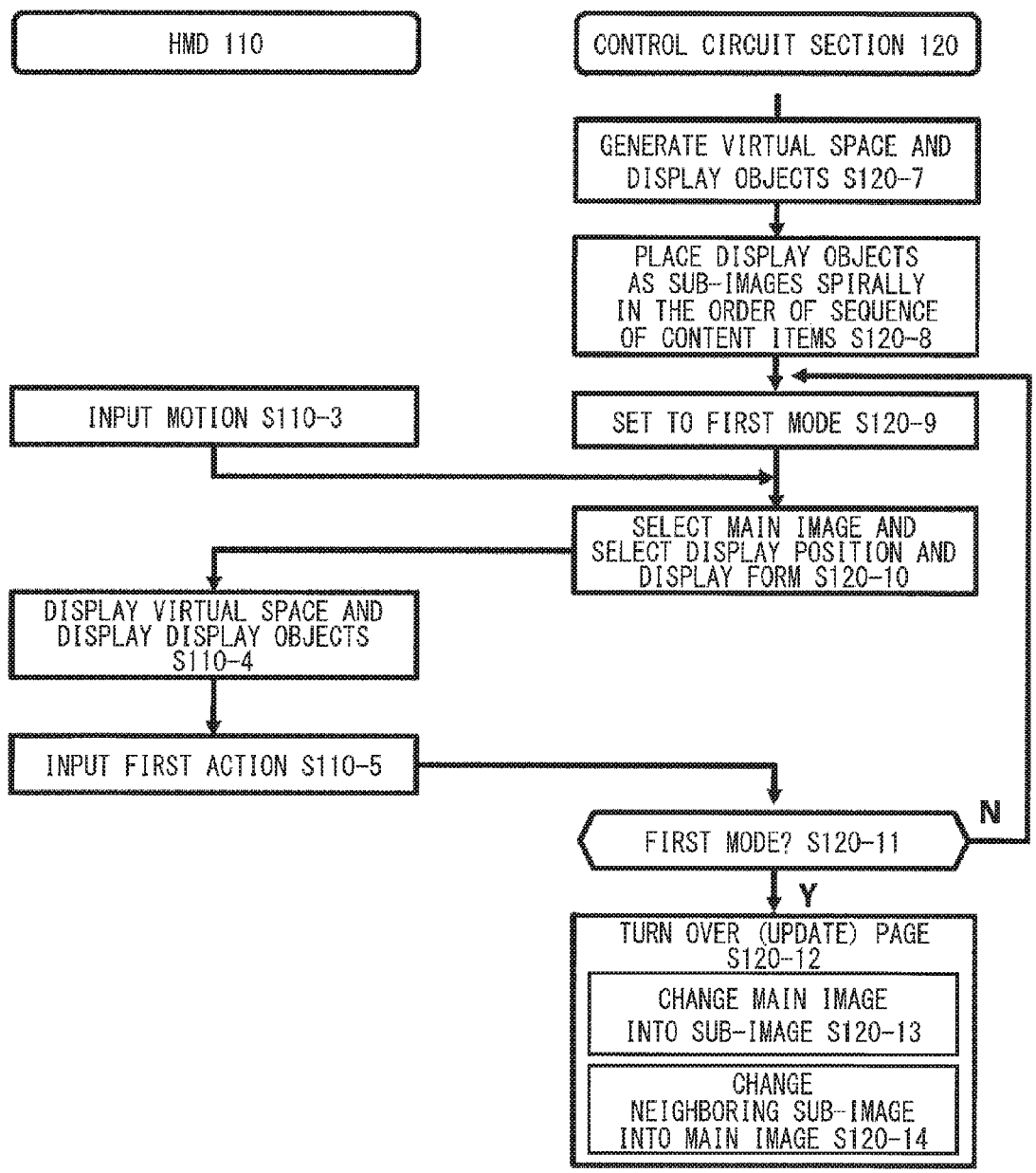
FIG. 9 is a flow chart of a process for implementing a function of the HMD system according to at least one embodiment.
Figure 10:
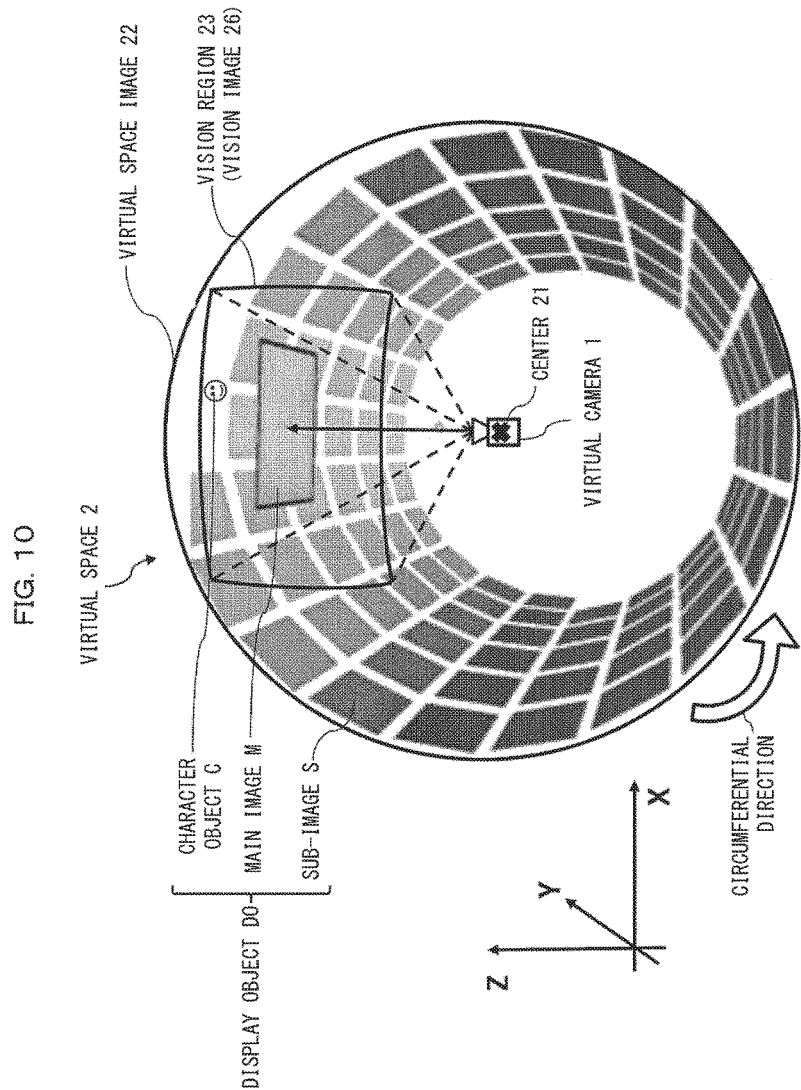
FIG. 10 is a view illustrating a virtual space according to at least one embodiment.

At least one example of a virtual space to be provided to the user and a flow of a process performed by the HMD system 100 to provide the virtual space to the user will be discussed with reference to FIG. 6, FIG. 9, and the subsequent drawings. First, the display control section 200 refers to the spatial information storing section 510 and the object information storing section 520 to generate the virtual space 2 as illustrated in FIG. 10 and display objects DO (S120-7). In at least one embodiment, a plurality of display objects DO makes up a content, like a comic, containing characters and illustrations, and include individual pages for making up the content. That is, a plurality of display objects DO have a sequence based on a story of the content. Note, however, that the display objects DO may include a character object C that is independent of the sequence of the content. When the object selecting section 310 selects a plurality of display objects DO which are to be placed in the virtual space 2, the display form determining section 320 causes the plurality of display objects DO to be placed in a manner like a spiral along a hemispherical plane of the virtual space 2 (S120-8). As illustrated in FIG. 10 and FIGS. 11A to 11D, a plurality of display objects DO are placed in accordance with the sequence of the content in a circumferential direction so as to draw a spiral in a Y-direction, the spiral starting from a portion close to a bottom of the hemispherical plane to a top of the hemispherical plane. That is, the display objects DO placed adjacent to one another in the circumferential direction of the spiral are display objects DO on consecutive pages in the story. In an initial state, the display objects DO placed in a manner like a spiral are placed as sub-images S, which are displayed in sub-views without an emphasis or other effect.

The display object DO is displayed in such a manner as to be superimposed on the virtual space image 22. In the present embodiment, the virtual space image 22 is composed of at least one color so that the user can concentrate on a content in the virtual space 2. For example, the virtual space image 22 may be composed of a single color or may be composed of a plurality of colors in gradation.

The mode setting section 340 sets control performed by the control circuit section 120 to a first mode (S120-9). In the present embodiment, the mode setting section 340 sets a mode in an initial state to the first mode. As discussed later, the first mode is a control mode in which a main image M, which is a selected one of the display objects DO, is displayed in a main view with an emphasis in the virtual space 2 in such a manner as to be associated with the basic sightline 5.

When an input of a given motion (e.g., variations in position and angle of the HMD 110) is made from the HMD 110 (S110-3), the basic sightline determining section 240 determines the basic sightline 5. Then, the object selecting section 310 selects, from among the display objects DO, a main image M to be displayed in the virtual space in the initial state in such a manner as to be associated with the basic sightline 5 (S120-10). In a case where the user views the content for the first time, a display object DO corresponding to a top page of the content is selected as the main image M. Further, in a case where a bookmark is set on a last viewed page at the previous viewing of the content, a display object DO corresponding to the last viewed page is selected as the main image M. The display form determining section 320 determines that the display object DO is to be displayed as the main image M in the virtual space 2. The display adjusting section 330 sets a placement position and placement angle of the main image M in the virtual space 2 (discussed in detail below).

The object control section 300 outputs, to the display control section 200, information on a display form of the display object DO. The vision image generating section 260 outputs, to the HMD 110, information on the virtual space 2 to be produced by the virtual space image 22 having the display object DO displayed thereon. Upon receipt of the information on the virtual space 2, the HMD 110 causes the virtual space 2 to be displayed on the display 112 (S110-4), thereby providing the virtual space 2 into which the user is immersed. As illustrated in FIG. 10, the virtual space 2 into which the user is immersed is preferably such that the virtual camera 1 is located on the center 21 of the hemisphere, and that the main image M and the sub-image S are contained within the vision region 23, which is set based on the basic sightline 5. This allows the user to have a new experience that the user goes on reading the comic in such an environment that the user is surrounded by individual pages of the comic.

The user can input a first action in the virtual space 2 (S110-5). The first action is an instruction for updating a display object DO being displayed as the main image M in the first mode. The first action may be a given motion of the HMD 110 (an action of shaking a head to the left or to the right), a given sightline movement obtained by the gaze sensor 140 (an action of moving eyes to the left or to the right), or an input from the external controller 150 (a swipe to the left or to the right).

Figure 11A:
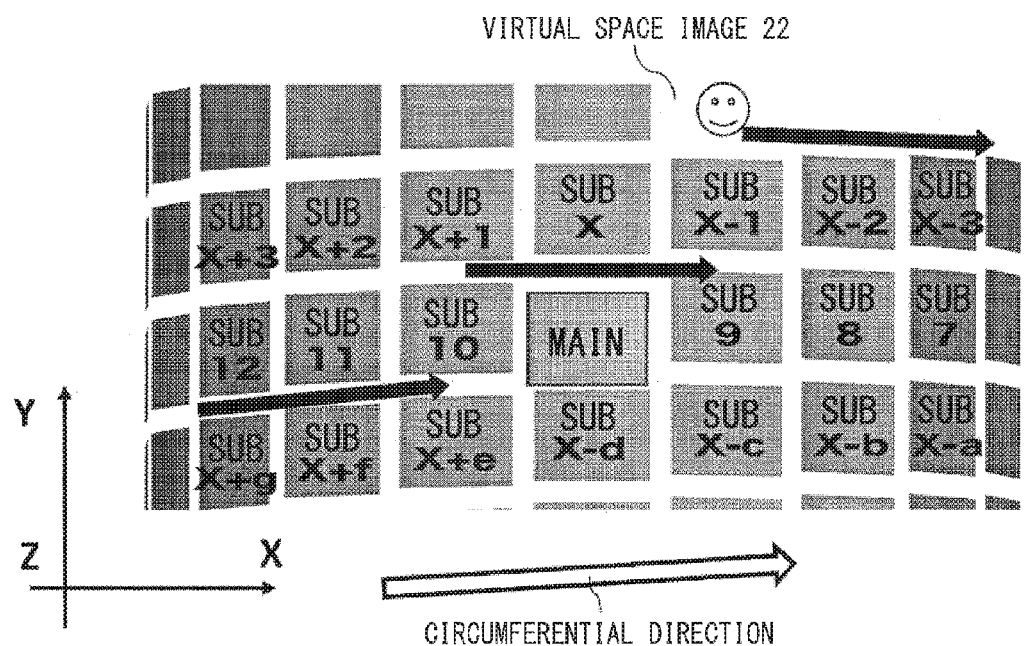
FIG. 11A is a view illustrating a page turn-over operation performed on display objects according to at least one embodiment.
Figure 11B:
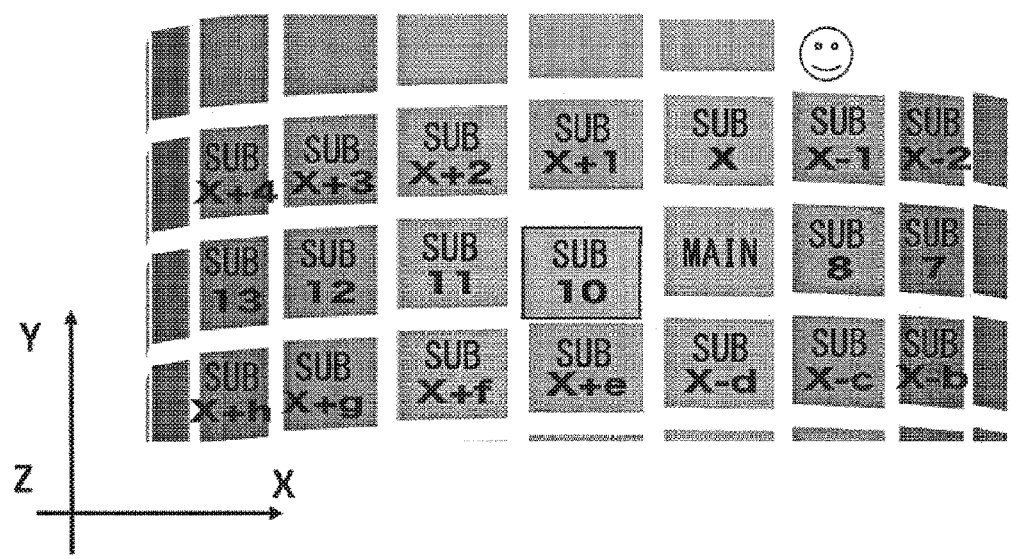
FIG. 11B is a view illustrating a page turn-over operation performed on display objects according to at least one embodiment.

In a case where the control circuit section 120 is in the first mode, the first action enables turning over a page shown in the main image M (S120-11, S120-12). For example, in a case where the user inputs an operation corresponding to a movement to the right (by shaking the head to the right, by moving the eyes to the right, or by the swipe to the right), an image being displayed as a main image in FIG. 11A is shifted to the right by one position and is changed into the sub-image, as illustrated in FIG. 11B (S120-13). Further, a sub-image 10, which is located immediately on the left side of the main image in FIG. 11A, is shifted to the right by one position and is changed into the main image (S120-14). Meanwhile, all the other sub-images are shifted to the right by one position while remaining unchanged as the sub-images. In this manner, the page shown in the main image M is updated to the subsequent page.

Figure 11C:
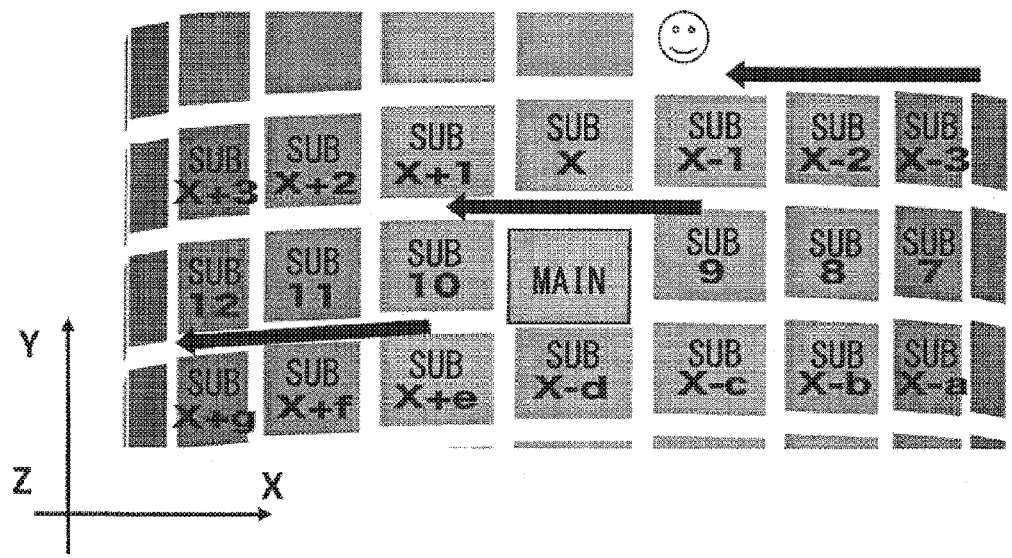
FIG. 11C is a view illustrating a page turn-over operation performed on display objects according to at least one embodiment.
Figure 11D:
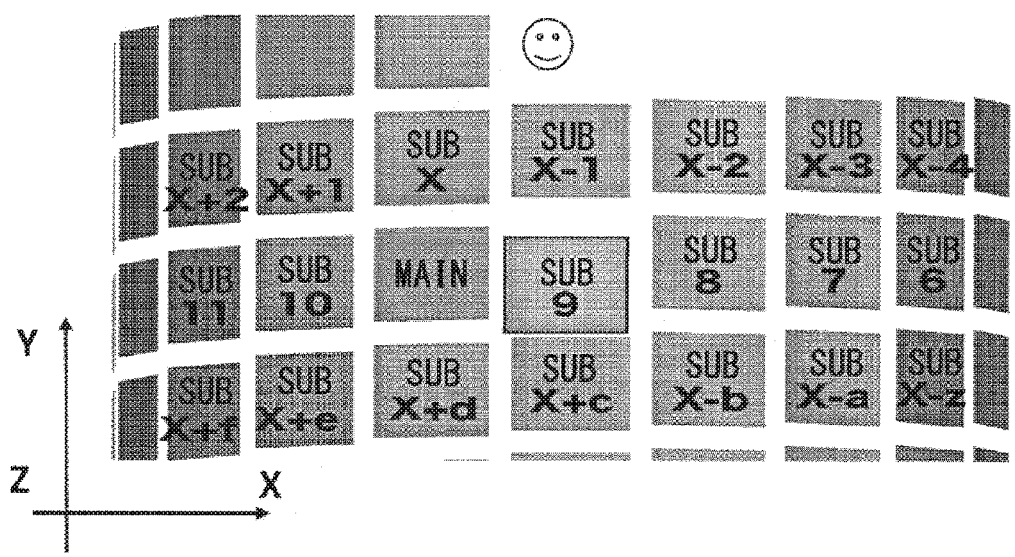
FIG. 11D is a view illustrating a page turn-over operation performed on display objects according to at least one embodiment.

In a case where the user inputs an operation corresponding to a movement to the left (by shaking the head to the left, by moving the eyes to the left, or by the swipe to the left), an image being displayed as a main image in FIG. 11C is shifted to the left by one position and is changed into the sub-image, as illustrated in FIG. 11D (S120-13). Further, a sub-image 9, which is located immediately on the right side of the main image in FIG. 11C, is shifted to the left by one position and is changed into the main image (S120-14). Meanwhile, all the other sub-images are shifted to the left by one position while remaining unchanged as the sub-images. In this manner, the page shown in the main image M is updated to the preceding page.

Figure 12:
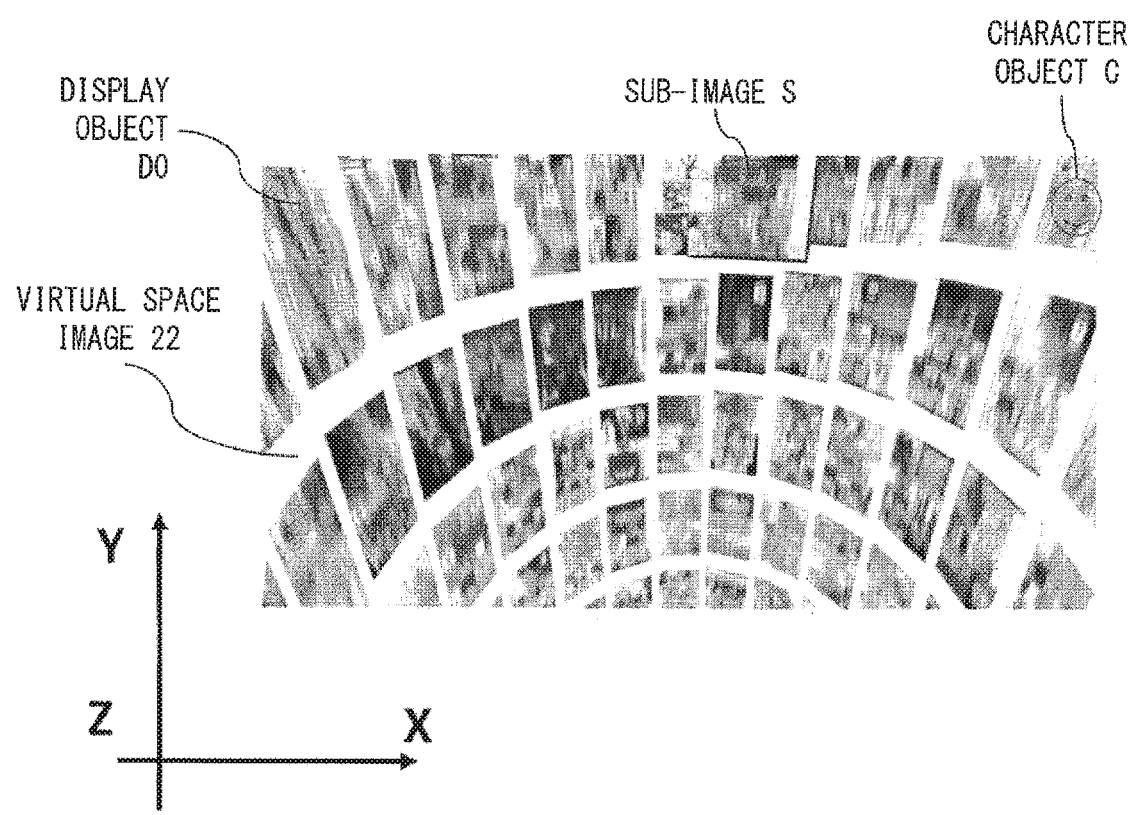
FIG. 12 is a view illustrating a page turn-over operation performed on display objects according to at least one embodiment.
Figure 15:
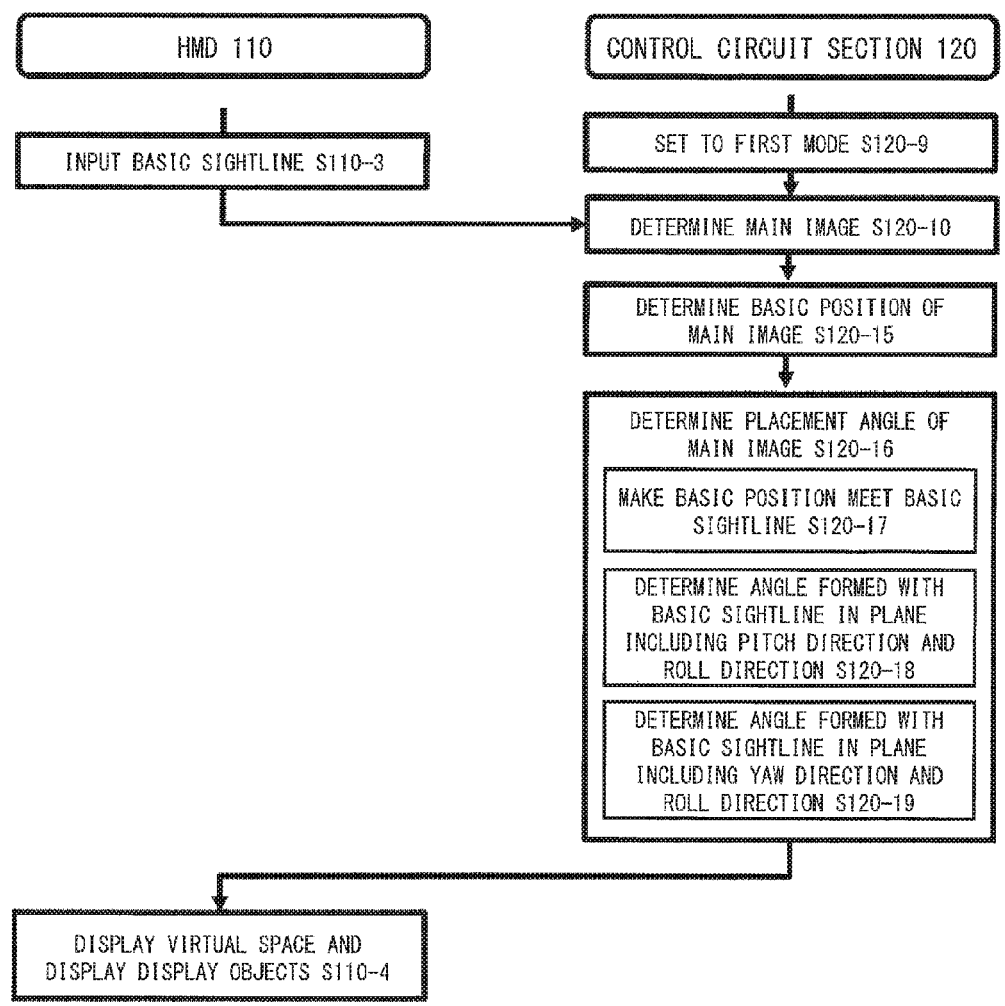
FIG. 15 is a flow chart of a process for implementing a function of the HMD system according to at least one embodiment.

In updating the page shown in the main image M, the display adjusting section 330 may move the positions of the display objects DO or may update only images to be displayed without moving the positions of the display objects DO. In these cases, the display adjusting section 330 may perform processing for reducing visual effects on content items shown by the display objects DO before the positions of the display objects DO are moved or before the content items shown by the display objects DO are updated, as illustrated in FIG. 12. The processing for reducing the visual effects may be processing for disabling the content items recognizable. Example of such processing includes processing of blurring an image as illustrated in FIG. 12, processing of decreasing a resolution, and processing of creating a smoke effect. This allows for reduction of visually induced motion sickness (so-called virtual reality (VR) sickness) which is caused when the user experiences a visual effect that occurs independent of a motion of the HMD 110.

In the present embodiment, the virtual space image 22 is composed of at least one color. In such a case, it is preferable that the processing for reducing a visual effect is not performed on the virtual space image 22. The virtual space image 22 composed of at least one color originally has a small amount of information on a visual effect. For this reason, the user is less affected by the visual effect that occurs independent of a motion of the HMD 110. As such, the user is less likely to suffer from the VR sickness. Thus, performing the processing for reducing a visual effect only on a display object DO enables reduction of a processing load on the control circuit section 120.

FIGS. 13A, 13B, and 14 illustrate examples of the main image M selected by the object selecting section 310 and a relationship between the main image M and the sub-images S, which relationship is determined by the display adjusting section 330. As illustrated in FIGS. 13A and 13B, the virtual camera 1 is located at the center of a region enclosed with the sub-images, and a main image is placed farther forward to the front of the virtual camera 1 than sub-images are, so that the main image is recognized by the user as being displayed with an emphasis so as to be scaled up. At this time, the display adjusting section 330 can place the main image M forward and slightly scale up the main image M (e.g., from 1.2 times to 1.5 times of the original size) so that the main image M is displayed with a further emphasis. In the present embodiment, it is preferable that the user is positioned constantly at the center 21 of the virtual space 2. In this situation, it is assumed that only the orientation of the basic sightline 5 is changed in response to a motion of the HMD 110. Furthermore, it is preferable that, in response to a change in orientation of the basic sightline 5, all of the sub-images S and the main image M are so placed as to be orthogonal to the basic sightline 5 in a horizontal plane (XZ-plane).

FIG. 14 illustrates an example of a display object management table T1 stored in the object information storing section 520. The display object management table T1 stores page numbers of pages that make up a content and also stores their associated image files, image sizes, and display styles. The display form determining section 320 refers to the display object management table T1. In a case where the display style is set to "Normal" in the display object management table T1, the display form determining section 320 causes only a single display object DO to be shown in the main image M, as illustrated in FIG. 13A. In contrast, in a case where the display style is set to "Spread" in the display object management table T1, the display form determining section 320 causes two or more consecutive display objects DO to be displayed in the main image M, as illustrated in FIG. 13B. In this case, the size of the main image M is set to a sum of sizes of the plurality of display objects DO. This allows the user to enjoy viewing visually impactful spread pages.

Figure 16A:
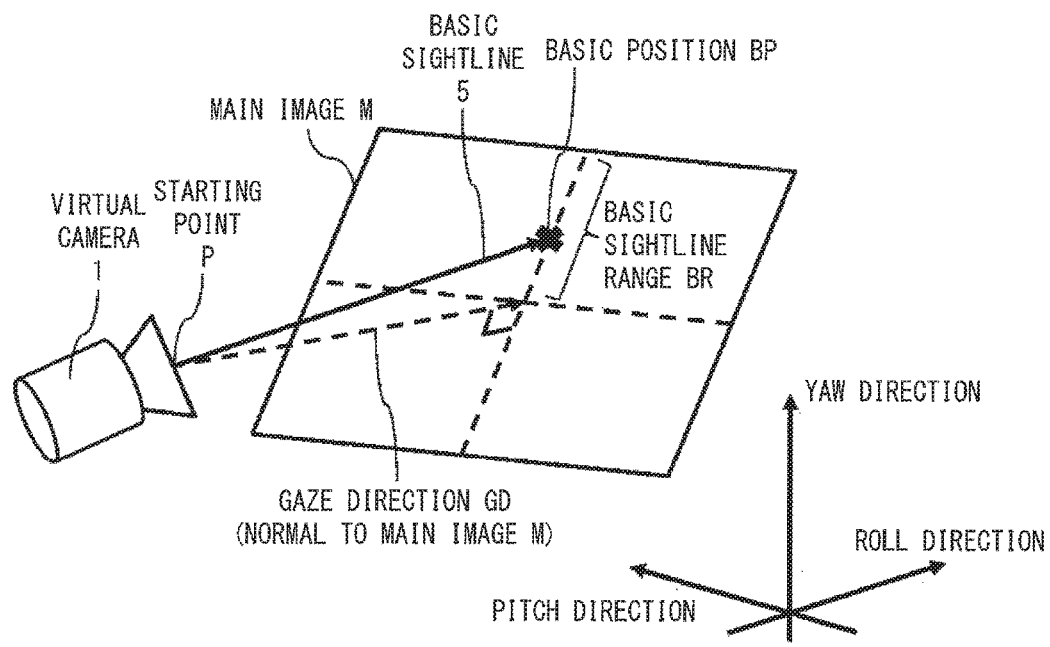
FIG. 16A is a view illustrating a placement angle of the main image according to at least one embodiment.

A display angle of the main image M, which display angle is set by the display adjusting section 330, will be discussed with reference to FIG. 15 and FIGS. 16A to 16C. When a motion (information on the basic sightline 5) is inputted from the HMD 110 (S110-3) in a situation where the first mode is set by the mode setting section 340 (S120-9), the object selecting section 310 selects a display object DO to be displayed as the main image M (S120-10). The display adjusting section 330 determines a basic position BP of the selected main image M (S120-15). As illustrated in FIG. 16A, the basic position BP, which is a given position included in the main image M, serves as a reference for a setting of an initial position of a sub-image as displayed in a main view. In the present embodiment, the basic position BP is located at a center of the main image M in a pitch direction and is set to a position shifted in a yaw direction from a center of the main image M in the yaw direction (at any position that falls within the basic sightline range BR). In an initial state, the position of the main image M is so set that the basic sightline 5 intersects the basic position BP. Further, the angle of the main image M is so set that a normal to the main image M intersects a starting point P, which is a point of intersection of the basic sightline 5 and the virtual camera 1 (S120-16).

Figure 16B:
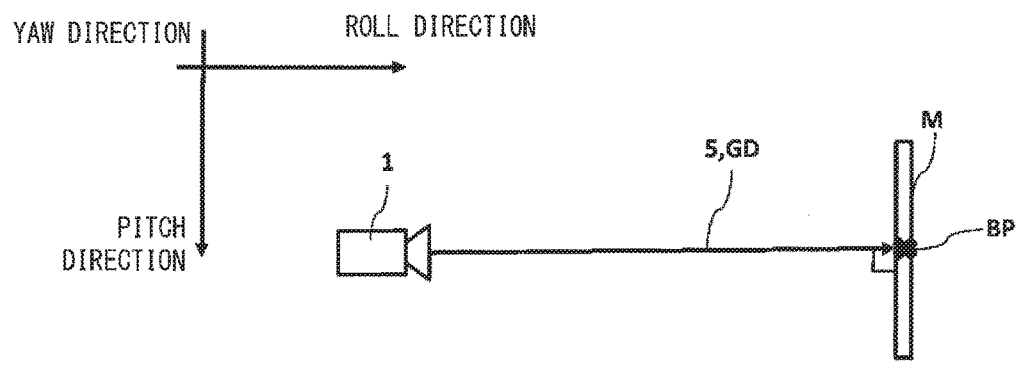
FIG. 16B is a view illustrating a placement angle of the main image according to at least one embodiment.
Figure 16C:
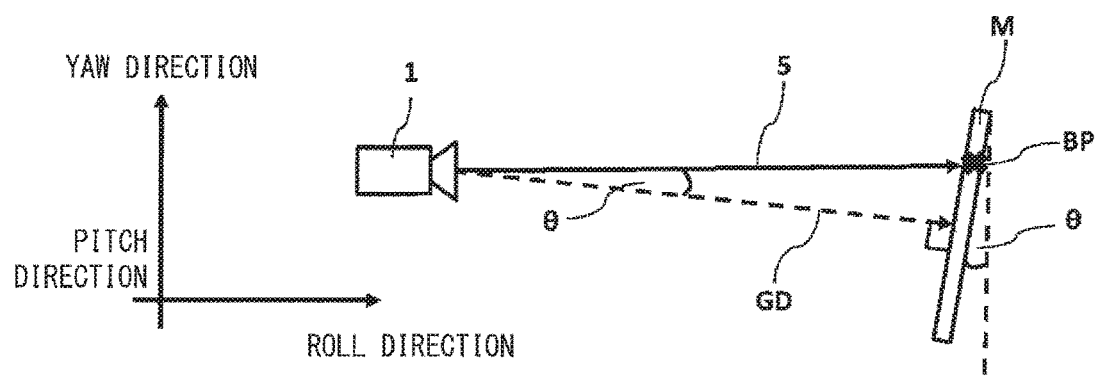
FIG. 16C is a view illustrating a placement angle of the main image according to at least one embodiment.
Figure 17:
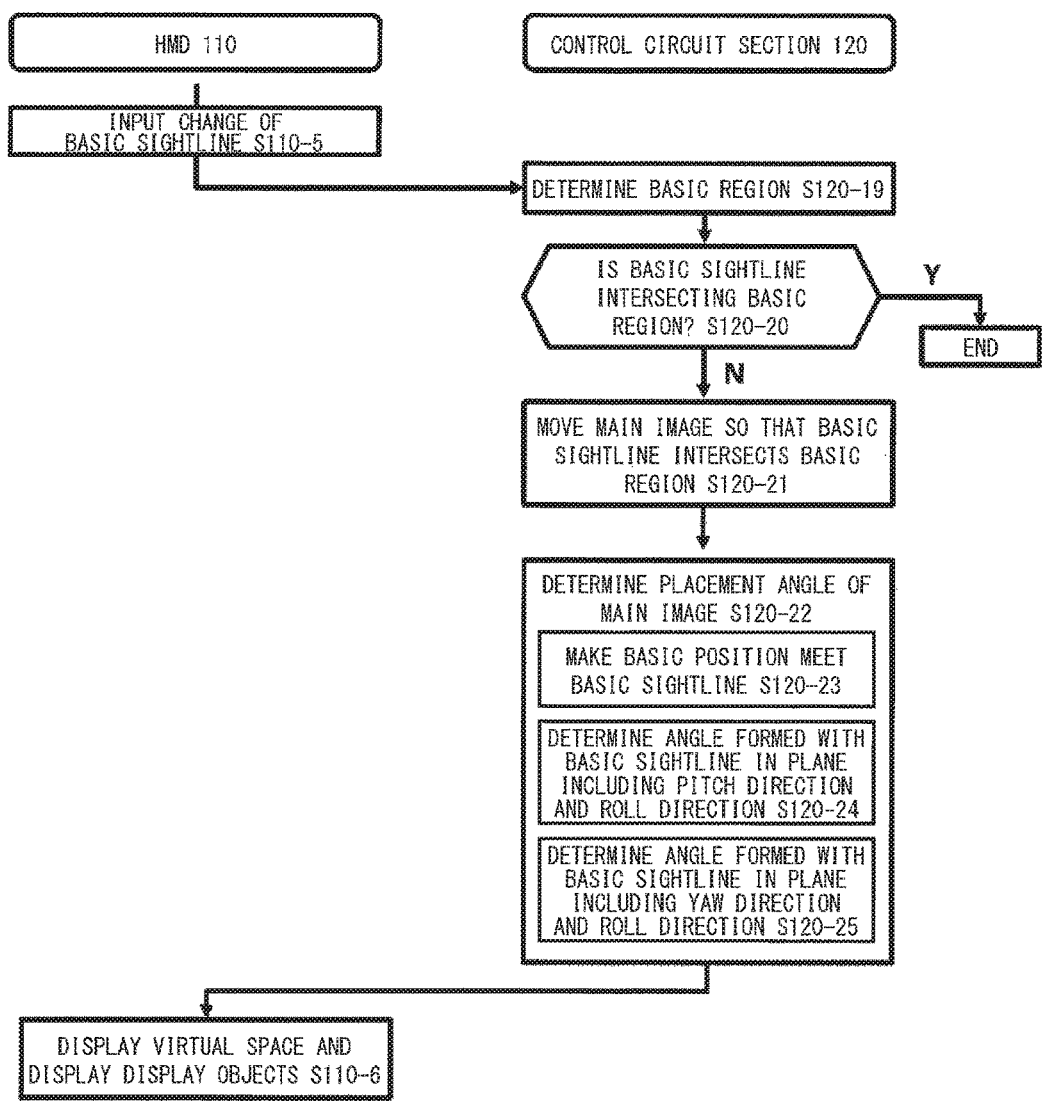
FIG. 17 is a flow chart of a process for implementing a function of the HMD system according to at least one embodiment.

In S120-16, the display adjusting section 330 first sets the position of the main image M to such a position that the basic sightline 5 meets the basic position BP (to such a position that the basic sightline 5 intersects the basic position BP) (S120-17). Then, as illustrated in FIG. 16B, the display adjusting section 330 determines an angle which the basic sightline 5 forms with the main image M in a horizontal plane (a plane including a pitch direction and a roll direction). In the present embodiment, the position and angle of the main image M are so set that the basic sightline 5 is substantially orthogonal to the main image M. Subsequently, as illustrated in FIG. 16C, the display adjusting section 330 determines an angle which the basic sightline 5 forms with the main image M in a vertical plane (a plane including a yaw direction and a roll direction). In the present embodiment, the display adjusting section 330 sets the angle which the basic sightline 5 forms with the main image M in the vertical plane, by rotating the main image M by an angle θ about a pitch axis so that a lower end of the main image M is closer to the virtual camera 1 side. In at least one embodiment, the angle θ is an angle at which the basic sightline 5 forms an angle of smaller than 90° with the main image M, and in at least one embodiment an angle at which the basic sightline 5 forms an angle of larger than 60° but smaller than 85° with the main image M. The normal to the main image M may intersect the starting point P of the basic sightline 5 in the vertical plane.

The drawing section 360 draws the main image M with its position and angle set in the manner as discussed above and then outputs the main image M to the display control section

200. Subsequently, the display control section 200 outputs the main image M to the HMD 110 (S110-4). This allows the user to view the main image M which is orthogonal to the direction of the basic sightline 5 in a horizontal plane and to view the main image M which is slightly tilted upward relative to the direction of the basic sightline 5 in a vertical plane. In the present embodiment, it is preferable that the basic sightline 5 is defined as a vision direction which is detected according to a tile of the HMD 110. A line of sight of the user tends to gradually go a little downward relative to the roll direction, which is a direction that the user's head faces the front. Since the main image M is placed at the position and angle as discussed above, the main image M viewed by the user when a natural sightline direction (gaze direction GD) of the user points to the main image M can be angled so as to be substantially perpendicular to the sightline direction. Further, the basic position BP may be so set that the normal to the main image M intersects the starting point P of the basic sightline 5. With this arrangement, the main image M can be naturally angled so as to be perpendicular in a vertical plane when the user views the main image M. Note that the angle θ which the basic sightline 5 forms with the main image M may be altered by, for example, changing the basic position BP to suit a preference of the user. In this arrangement, the display adjusting section 330 may adjust the angle θ by rotating the main image M about a pitch axis that passes through the center of the main image M. With this arrangement, the virtual space 2 can be configured to be adapted to differences among individuals in the amount of angle by which the gaze direction of the user points downward and to suit a preference of the user in angle at which the user gazes the main image M.

Next, processing performed when a change of the basic sightline 5 of the user is inputted after the main image M is displayed will be discussed with reference to FIG. 17 and FIGS. 18A to 18C. When a change of the basic sightline 5 is inputted in response to a change in motion of the HMD 110 (S110-5), the judging section 350 determines a basic region BRE (S120-19). In the present embodiment, the basic region BRE is set as a region that encompasses the main image M. The judging section 350 judges whether the basic sightline 5 intersects the basic region BRE (S120-20).

Figure 18A:
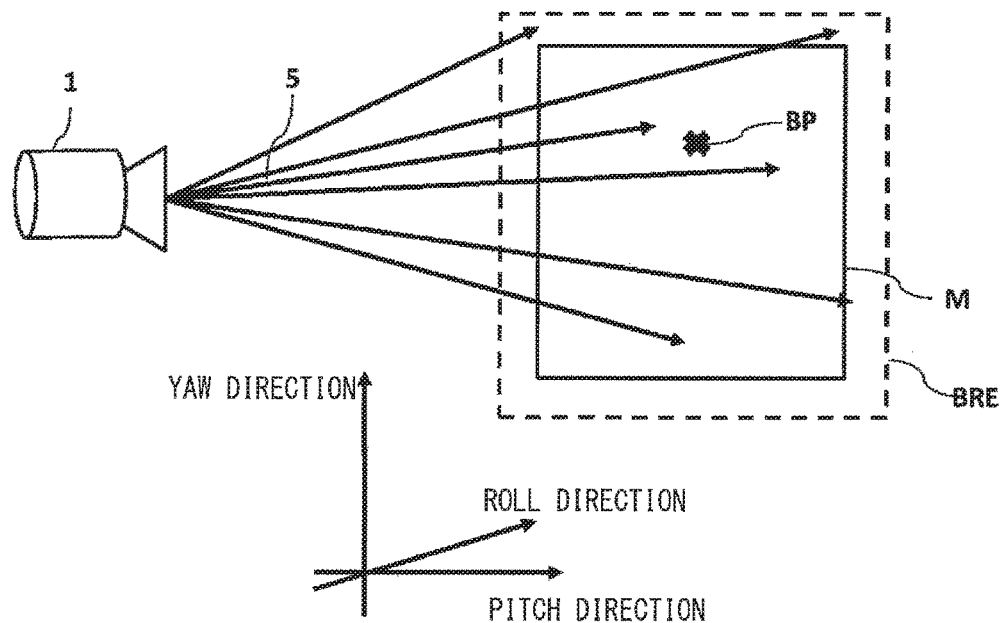
FIG. 18A is a view illustrating a relationship between movement of a basic sightline and placement of the main image according to at least one embodiment.

In a case where the basic sightline 5 intersects the basic region BRE as illustrated in FIG. 18A, the display adjusting section 330 skips adjustment of the placement position and angle of the main image M. With this arrangement, the position and angle of the main image M remain unchanged even in the event of the occurrence of a slight change in tilt of the HMD 110 when the user points his/her sightline at the corner of the main image M. This allows the user to easily view the whole content.

Figure 18B:
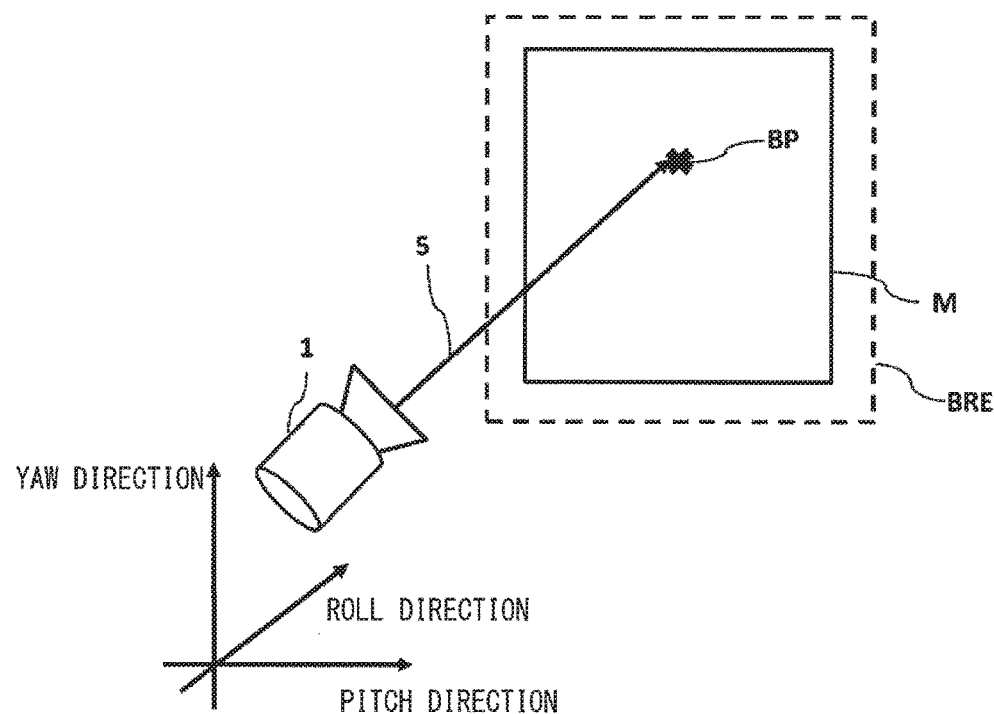
FIG. 18B is a view illustrating a relationship between movement of a basic sightline and placement of the main image according to at least one embodiment.
Figure 18C:
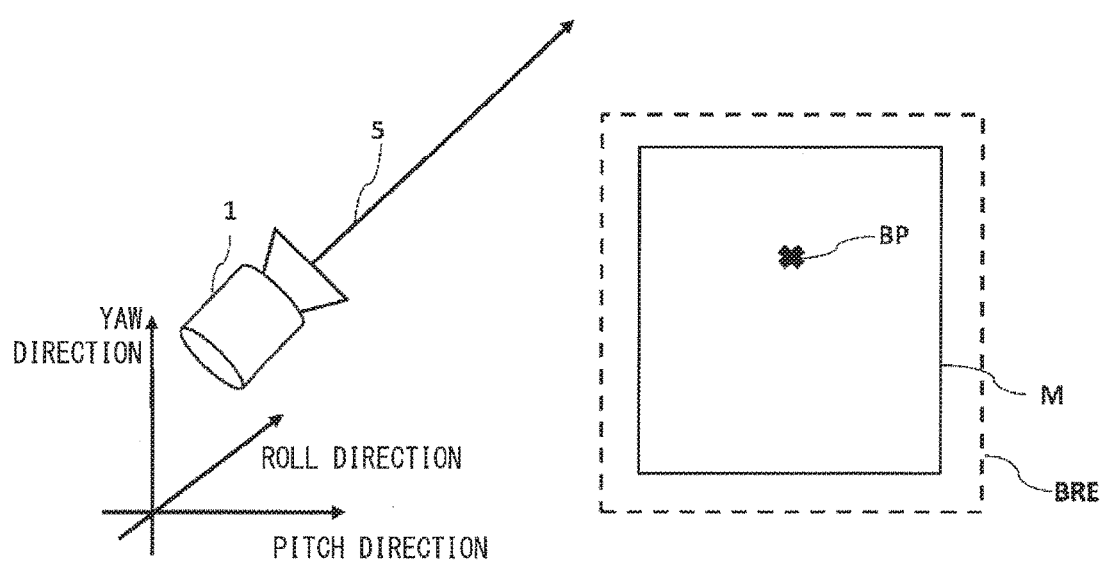
FIG. 18C is a view illustrating a relationship between movement of a basic sightline and placement of the main image according to at least one embodiment.

In contrast, in a case where the basic sightline 5 does not intersect the basic region BRE as illustrated in FIG. 18C, the display adjusting section 330 adjusts the placement position and placement angle of the main image M. First, as illustrated in FIG. 18B, the display adjusting section 330 moves the position of the main image M so that the basic sightline 5 intersects the basic region BRE (S120-21). In S120-21, it is preferable that the display adjusting section 330 moves the main image M to such a position that the basic sightline 5 intersects the basic position BP. Further, the display adjusting section 330 adjusts an angular relationship between the basic sightline 5 and the main image M as the main image M has been moved (S120-22). Specifically, in order to have the angular relationship as illustrated in FIGS. 16A to 16C, the display adjusting section 330 performs a step of making the basic position BP and the basic sightline 5 (S120-23)

meet each other, a step of adjusting an angle between the basic sightline 5 and the main image M in a horizontal phase (S120-24), and a step of adjusting an angle between the basic sightline 5 and the main image M in a vertical phase (S120-25). In S120-21, the main image M may be moved in response to the movement of the basic sightline 5, while maintaining an angular relationship between the basic sightline 5 and the main image M.

The drawing section 360 draws the main image M with its position and angle set as discussed above and then outputs the main image M to the display control section 200. Subsequently, the display control section 200 outputs the main image M to the HMD 110 (S110-6). With this arrangement, the main image M can be displayed in pursuit of the basic sightline 5 that moves in response to a user's relatively large motion to change his/her posture. This allows the user to enjoy the content with ease in a posture that the user likes.

Figure 19:
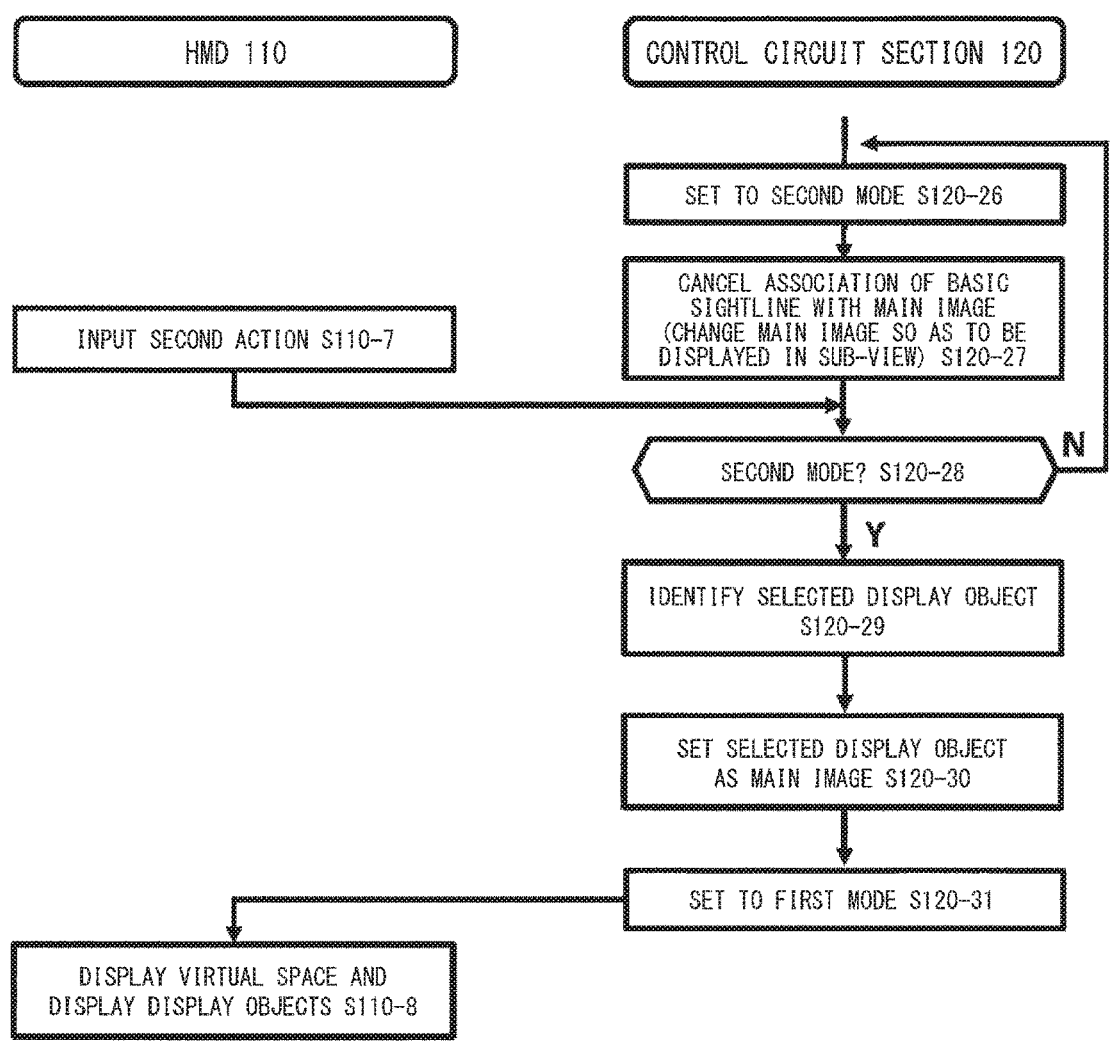
FIG. 19 is a flow chart of a process for implementing a function of the HMD system according to at least one embodiment.
Figure 20A:
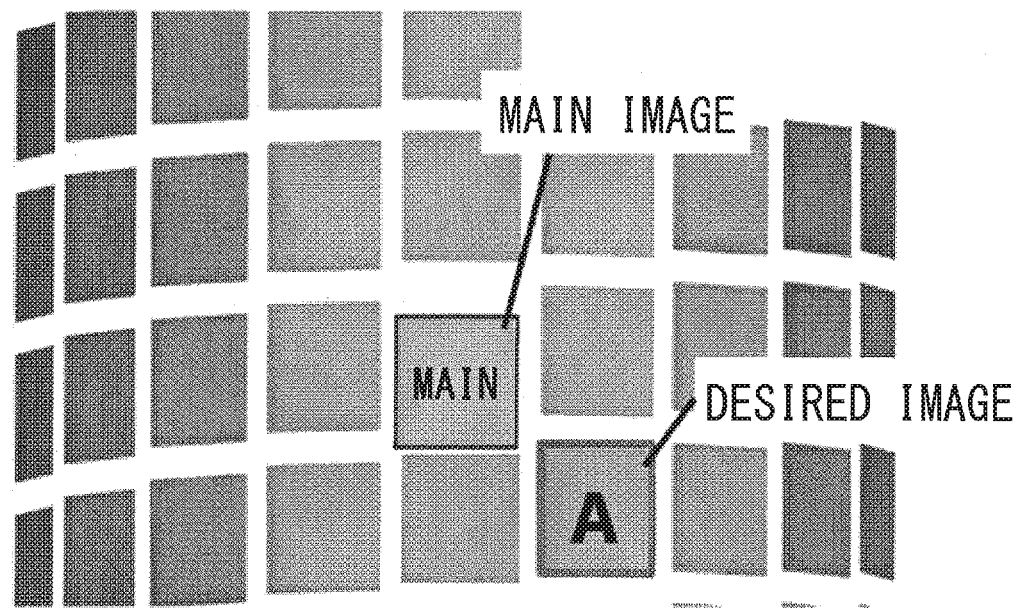
FIG. 20A is a view illustrating a page jump operation performed on a display object according to at least one embodiment.
Figure 20B:
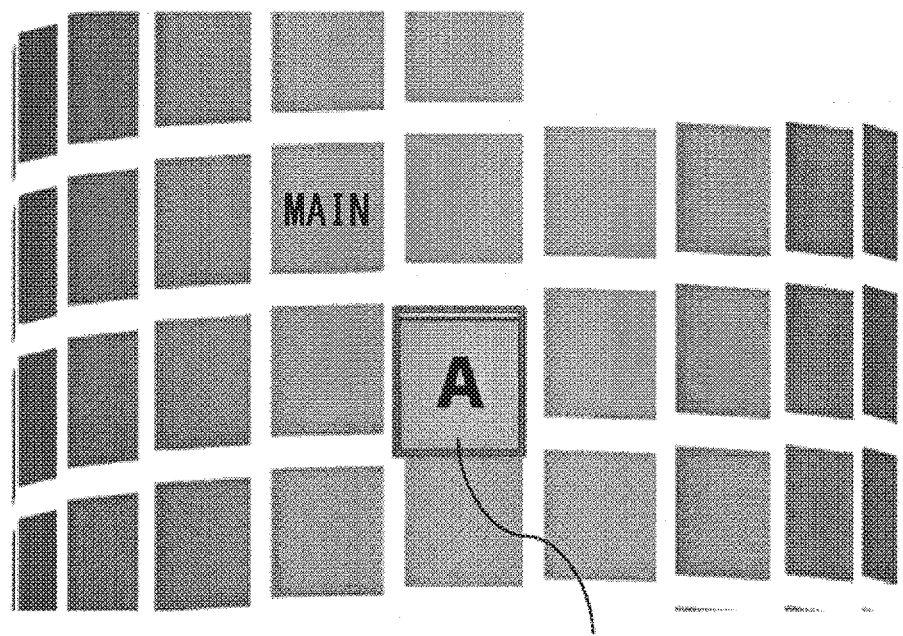
FIG. 20B is a view illustrating a page jump operation performed on a display object according to at least one embodiment.

The following will discuss a second mode set by the mode setting section 340 with reference to FIGS. 19, 20A, and 20B. When a given input from the user is accepted, the mode setting section 340 sets control performed by the control circuit section 120 to a second mode (S120-26). Thus, as illustrated in FIG. 20A, the display form determining section 320 changes a display form of a current main image from a main view with an emphasis to a sub-view and cancels the aforementioned association of the basic sightline 5 with the main image M (S120-27). This allows the user to view many sub-images S collectively.

Subsequently, the user inputs a given second action to a target sub-image S (S110-7). The second action is, for example, an action of pointing the basic sightline 5 (a vision direction that is shifted in response to a tilt of the HMD 110 or a sightline direction determined by the gaze sensor 140) at a target sub-image for a certain period of time or more. Alternatively, the second action may be an action of selecting a target sub-image S ("DESIRED IMAGE" indicated by the letter "A" in FIG. 20A) by using the external controller 150. In a case where the control circuit section 120 is set to the second mode (S120-28), the object control section 300 accepts the second action, and the object selecting section 310 identifies the display object DO (DESIRED IMAGE indicated by the letter "A") selected by the second action (S120-29).

As illustrated in FIG. 20B, the display form determining section 320 sets the selected display object DO as a main image, and the display adjusting section 330 sets the position and angle of that display object DO in the manner as discussed above (S120-30). Further, the mode setting section 340 sets processing performed by the control circuit section 120 to the first mode so that manipulations on the main image can be performed in response to a movement of the basic sightline 5 of the user (S120-31). The drawing section 360 draws the main image M with its position and angle set in the manner as discussed above and then outputs the main image M to the display control section 200. Subsequently, the display control section 200 outputs the main image M to the HMD 110 (S110-8). This allows the user to perform a manipulation of a page jump to a target sub-image. After the page jump is performed, the destination sub-image can be displayed at an easy-to-read angle.

Although the above description has discussed the embodiments of the present disclosure, the present disclosure is not limited to the embodiments discussed above. As those skilled in the art will understand, various changes of the embodiments can be made without departing from the spirit and scope of the present disclosure in the appended claims.

For example, in the above embodiment, the processing performed by the control circuit section 120 is set to the first mode in the initial state. However, the processing may be set to the second mode in the initial state. Further, the first mode and the second mode may be set as necessary by a given user's input.

Further, in the states illustrated in FIGS. 13A and 13B in the first mode, at the occurrence of a movement of the basic sightline 5, none of the display objects DO may be placed in a vacant location, in the virtual space 2, from which the main image M has been moved to another location.

This allows the user to easily know the position of a page corresponding to the main image M in the content even after the basic sightline 5 is moved. At the occurrence of a movement of the basic sightline 5, the sub-images S may be moved to fill the vacant location, in the virtual space 2, from which the main image M has been moved to another location.

REFERENCE SIGNS LIST

100 Head-mounted display (HMD) system
110 HMD
112 Display
114 Sensor section
120 Control circuit section
130 Motion sensor
132 Sensing section
140 Gaze sensor
150 External controller
200 Display control section
300 Object control section
400 Communication control section
500 Storage section
1 Virtual camera
2 Virtual space
5 Basic sightline
22 Virtual space image
23 Vision area
26 Vision image
BP Basic position
BR Basic sightline range
BRE Basic region
DO Display object
M Main image
S Sub-image

The invention claimed is:

1. A method for providing, to a head-mounted display with use of a control circuit and a storage section, a virtual space into which a user is immersed, the control circuit being configured to carry out the steps of:
generating a virtual space into which a user is immersed;
determining a basic sightline of the user;
selecting a main image from among a plurality of display objects;
causing the main image to be displayed in the virtual space in such a manner as to be associated with the basic sightline; and
outputting the virtual space to the head-mounted display, the basic sightline moving in response to a motion of the head-mounted display in a pitch direction, in a yaw direction, and in a roll direction,
the main image being so placed as to be tilted such that the basic sightline forms an angle of smaller than 90° with the main image in a plane including the yaw direction and the roll direction,
the virtual space being a three-dimensional space generated by placing, along a hemispherical plane, a panoramic image stored in the storage section, the plurality of display objects being placed along the hemispherical plane.

2. The method according to claim 1, wherein
the main image contains two or more of the display objects making up a given content, wherein the two or more of the display objects are consecutive display objects.

3. The method according to claim 2, wherein
the plurality of display objects are placed in a manner like a spiral along the hemispherical plane, and two or more of the display objects which two or more are placed adjacent to each other in a circumferential direction of the spiral are consecutive display objects.

4. The method according to claim 2, wherein
the control circuit is configured to further carry out the steps of:
accepting a first action from the user; and,
in response to the first action, causing a display object previously displayed in a main view to be displayed in one of sub-views without an emphasis in the virtual space, and causing a display object proceeding to or subsequent to the display object previously displayed in the main view to be displayed in the main view in the virtual space.

5. The method according to claim 4, wherein
the control circuit is configured to further carry out the step of:
making a shift to a first mode in which the basic sightline is associated with a main image displayed in the main view,
wherein the first action is accepted when a given user's operation is accepted in the first mode.

6. The method according to claim 5, wherein
in a case where a movement of the basic sightline occurs in the first mode, the main image is moved from one location to another location in pursuit of the basic sightline, and none of the display objects is placed in the location from which the main image is moved in the virtual space.

7. The method according to claim 1, wherein
the main image is so placed as to be tilted such that the basic sightline forms an angle of larger than 60° but smaller than 85° with the main image in the plane including the yaw direction and the roll direction.

8. The method according to claim 1, wherein
the main image is moved in response to movement of the basic sightline, while maintaining an angular relationship between the basic sightline and the main image.

9. The method according to claim 1, wherein
the basic sightline intersects a basic position of the main image, and
the basic position is located at a position shifted in the yaw direction from a center of the main image.

10. The method according to claim 1, wherein
a starting point of the basic sightline intersects a normal to the main image.

11. The method according to claim 1, further comprising the steps of:
setting a basic region based on the main image; and
in a case where the basic sightline is moved to a position falling outside the basic region, moving the main image so that the basic sightline is located within the basic region.

12. The method according to claim 11, wherein the basic region is so set as to encompass the main image.

13. The method according to claim 1, wherein the control circuit is configured to further carry out the steps of:
accepting a second action from the user; and,
in response to the second action, causing a selected one of the display objects displayed in sub-views without emphasis in the virtual space to be displayed in a main view in the virtual space, and causing a display object previously displayed in the main view to be displayed in one of the sub-views in the virtual space.

14. The method according to claim 13, wherein the control circuit is configured to further carry out the step of:
making a shift to a second mode in which the basic sightline is not associated with a main image displayed in the main view,
wherein the second action is accepted when a given user's operation is accepted in the second mode.

15. The method according to claim 1, wherein the control circuit is configured to further carry out the steps of:
making a shift to a first mode in which the basic sightline is associated with a main image displayed in a main view; and
making a shift to a second mode in which the basic sightline is not associated with the main image displayed in the main view,
wherein a mode is switchable between the first mode and the second mode.

16. The method according to claim 1, wherein the control circuit is configured to further carry out the steps of:
causing the display objects other than a display object displayed in a main view to be displayed in sub-views without emphasis in the virtual space;
causing a selected one of the display objects displayed in the sub-views in the virtual space to be displayed in the main view in the virtual space; and
causing a display object previously displayed in the main view to be displayed in one of the sub-views in the virtual space, while updating displays of display objects previously displayed in the sub-views in the virtual space.

17. The method according to claim 16, wherein the control circuit is configured to further carry out the step of:
in updating displays of the display objects previously displayed in the sub-views in the virtual space, performing processing for reducing visual effects on content items shown by the display objects.

18. The method according to claim 17, wherein the control circuit is configured such that
during the processing for reducing visual effects of the display objects, a visual effect of the virtual space image is not reduced.

19. A non-transitory computer-readable recording medium in which a computer program is stored
the computer program being a program for providing, to a head-mounted display with use of a control circuit and a storage section, a virtual space into which a user is immersed, the program being configured to cause the control circuit to carry out the steps of:
generating a virtual space into which the user is immersed;
determining a basic sightline of the user;
selecting a main image from among a plurality of display objects;
causing the main image to be displayed in the virtual space in such a manner as to be associated with the basic sightline; and
outputting the virtual space to the head-mounted display,
the basic sightline moving in response to a motion of the head-mounted display in a pitch direction, in a yaw direction, and in a roll direction,
the main image being so placed as to be tilted such that the basic sightline forms an angle of smaller than 90° with the main image in a plane including the yaw direction and the roll direction,
the virtual space being a three-dimensional space generated by placing, along a hemispherical plane, a panoramic image stored in the storage section, the plurality of display objects being placed along the hemispherical plane.

20. A head-mounted display system including a control circuit and a storage section and configured to provide, to a head-mounted display, a virtual space into which a user is immersed,
the control circuit being configured to
generate a virtual space into which the user is immersed;
determine a basic sightline of the user;
select a main image from among a plurality of display objects;
cause the main image to be displayed in the virtual space in such a manner as to be associated with the basic sightline; and
output the virtual space to the head-mounted display,
the basic sightline moving in response to a motion of the head-mounted display in a pitch direction, in a yaw direction, and in a roll direction,
the main image being so placed as to be tilted such that the basic sightline forms an angle of smaller than 90° with the main image in a plane including the yaw direction and the roll direction,
the virtual space being a three-dimensional space generated by placing, along a hemispherical plane, a panoramic image stored in the storage section, the plurality of display objects being placed along the hemispherical plane.

\* \* \* \* \*